(12) United States Patent
Kurosawa et al.

(10) Patent No.: US 12,473,873 B2
(45) Date of Patent: Nov. 18, 2025

(54) STIRLING MACHINE AND METHOD FOR MANUFACTURING STIRLING MACHINE

(71) Applicant: HONDA MOTOR CO., LTD., Tokyo (JP)

(72) Inventors: Yuta Kurosawa, Saitama (JP); Haruki Cho, Saitama (JP); Shun Miyabayashi, Saitama (JP); Tsuneo Endo, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/830,636

(22) Filed: Sep. 11, 2024

(65) Prior Publication Data

US 2025/0092844 A1    Mar. 20, 2025

(51) Int. Cl.
*F02G 1/055*     (2006.01)
*F02G 1/043*     (2006.01)
*F02G 1/057*     (2006.01)

(52) U.S. Cl.
CPC ............. *F02G 1/055* (2013.01); *F02G 1/043* (2013.01); *F02G 1/057* (2013.01)

(58) Field of Classification Search
CPC .......... F02G 1/043; F02G 1/053; F02G 1/055; F02G 1/057; F02G 2255/00; F02G 2255/10; F02G 2255/20; F28F 13/02; F28F 13/06; F28F 13/12; F28F 13/125
See application file for complete search history.

(56) References Cited

U.S. PATENT DOCUMENTS 4,984,428 A * 1/1991 Momose ................. F02G 1/043
                                                                60/517
2020/0370842 A1* 11/2020 Mook ...................... F23L 15/02

FOREIGN PATENT DOCUMENTS

JP        2022-126185 A      8/2022

* cited by examiner

*Primary Examiner* — Loren C Edwards
(74) *Attorney, Agent, or Firm* — Paratus Law Group, PLLC

(57) ABSTRACT

A Stirling machine including: a heat exchanger; an expansion chamber; and a compression chamber, in which the Stirling machine is configured to perform a Stirling cycle to convert heat into mechanical power, a heater of the heat exchanger includes a first flow channel configured to allow a working fluid to flow therethrough, and a second flow channel configured to allow a first fluid for exchanging heat with the working fluid to flow therethrough, a fluid introduction chamber for introducing the first fluid into the second flow channel is provided on an outer side of the expansion chamber, and a partition wall between the expansion chamber and the fluid introduction chamber is provided with a plurality of grooves on an expansion chamber side and/or a fluid introduction chamber side.

5 Claims, 16 Drawing Sheets

STIRLING MACHINE AND METHOD FOR MANUFACTURING STIRLING MACHINE

CROSS REFERENCE TO RELATED APPLICATIONS

This application claims priority to Japanese Patent Application No. 2023-149584 filed on Sep. 14, 2023, the content of which is incorporated herein by reference.

TECHNICAL FIELD

The present invention relates to a Stirling machine and a method for manufacturing the Stirling machine.

BACKGROUND ART

In recent years, researches and developments have been conducted that contribute to an improvement in energy efficiency in order to allow more people to access affordable, reliable, sustainable, and modern energy.

A Stirling engine is known as a heat engine that performs conversion between heat energy and mechanical power. In the Stirling engine, a working gas is reciprocated between an expansion chamber closer to a heater and a compression chamber closer to a cooler via the heater, a regenerator, and the cooler to repeat a volume change of the expansion chamber and the compression chamber, thereby performing conversion between heat energy and mechanical power (for example, see JP2022-126185A).

In a Stirling machine such as the Stirling engine, the output performance thereof greatly depends on the heat exchange amount of the working gas. It is desired to provide a Stirling machine having improved output performance and high heat efficiency in which the working gas can transfer a larger amount of heat energy.

An object of the present invention is to provide a Stirling machine having improved heat efficiency and a method for manufacturing the Stirling machine.

SUMMARY OF INVENTION

According to an aspect of the present invention, there is provided a Stirling machine including:
- a heat exchanger that includes a heater, a regenerator, and a cooler, which are connected in series;
- an expansion chamber that is disposed on a heater side and configured to allow a working fluid to expand therein; and
- a compression chamber that is disposed on a cooler side and configured to allow the working fluid to be compressed therein, in which
- the Stirling machine is configured to perform a Stirling cycle to convert heat into mechanical power by repeatedly changing volumes of the expansion chamber and the compression chamber while circulating the working fluid between the expansion chamber and the compression chamber via the heat exchanger,
- the heater includes
  - a first flow channel communicating with the expansion chamber and the regenerator and configured to allow the working fluid to flow therethrough, and
  - a second flow channel configured to allow a first fluid for exchanging heat with the working fluid to flow therethrough,
- a fluid introduction chamber for introducing the first fluid into the second flow channel of the heater is provided on an outer side of the expansion chamber, and
- a partition wall partitioning the expansion chamber and the fluid introduction chamber from each other is provided with a plurality of grooves on at least one of an expansion chamber side and a fluid introduction chamber side.

According to another aspect of the present invention, there is provided a method for manufacturing the Stirling machine including:
- forming the heater, the fluid introduction chamber, and the partition wall in one piece by additive manufacturing using a metal powder.

DESCRIPTION OF EMBODIMENTS

Hereinafter, a Stirling machine of an embodiment of the present invention will be described with reference to the accompanying drawings. Hereinafter, a β-type Stirling engine will be described as an example of the Stirling machine.

[Stirling Machine]

Figure 1:
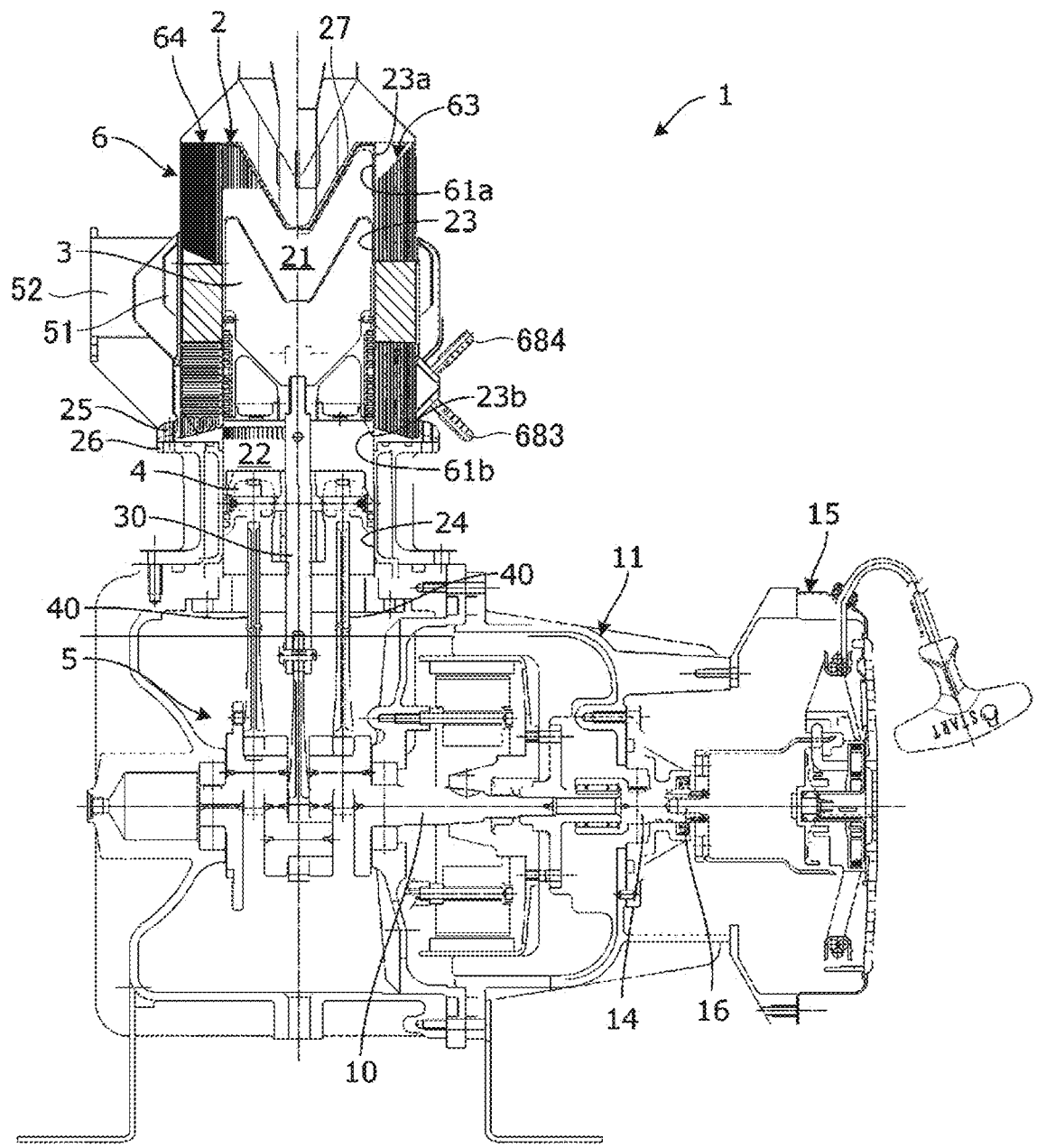
FIG. 1 is a cross-sectional view illustrating a Stirling engine 1 as an example of a Stirling machine according to the invention.

As illustrated in FIG. 1, a Stirling engine 1 includes a cylinder 2 in which a working gas is sealed, a displacer piston 3 and a power piston 4 inserted into the cylinder 2, a piston crank mechanism 5 connected to the displacer piston 3 and the power piston 4, and a heat exchanger 6 that raises and lowers a temperature of the working gas in the cylinder 2. The working gas is, for example, high-pressure air, helium, or hydrogen.

The Stirling engine 1 is, for example, a hermetic engine, and an electric generator 11 that extracts a shaft rotation output of the piston crank mechanism 5 as electric power is disposed inside a crankcase.

The cylinder 2 has a substantially cylindrical shape in which one end thereof is provided with a ceiling wall 27 and the other end thereof is open. In the following description, an axial direction of the cylinder 2 is also referred to as an up-down direction, and the ceiling wall 27 side and the opening side in the axial direction are also referred to as an upper side and a lower side, respectively.

In the cylinder 2, the displacer piston 3 is provided on the upper side, and the power piston 4 is provided on the lower side. An expansion chamber 21 in which the working gas has a high temperature is formed between the displacer piston 3 and the ceiling wall 27, and a compression chamber 22 in which the working gas has a low temperature is formed between the displacer piston 3 and the power piston 4. Hereinafter, the expansion chamber 21 and the compression chamber 22 in the cylinder 2 are also referred to as a working space 20.

The cylinder 2 includes a first cylinder 23 that is positioned on the upper side and a second cylinder 24 that is positioned on the lower side and has the same diameter as the first cylinder 23. The first cylinder 23 and the second cylinder 24 are coaxially connected to each other by flange portions 25 and 26 thereof.

A plurality of first communication portions 23a communicating with a plurality of first inlet-outlets (inlet-outlets) 61a of the heat exchanger 6 respectively, which will be described later, are provided on an outer peripheral surface of the first cylinder 23 on the upper side. The first communication portions 23a are provided in the same number as the first inlet-outlets 61a. Each first communication portion 23a is formed in a slit shape having substantially the same shape as the corresponding first inlet-outlet 61a, and is disposed in a manner of facing the corresponding first inlet-outlet 61a. The plurality of first communication portions 23a serve as inlet-outlets to the expansion chamber 21.

A plurality of second communication portions 23b communicating with a plurality of second inlet-outlets (inlet-outlets) 61b of the heat exchanger 6 respectively, which will be described later, are provided on the outer peripheral surface of the first cylinder 23 on the lower side. The second communication portions 23b are provided in the same number as the second inlet-outlets 61b. Each second communication portion 23b is formed in a slit shape having substantially the same shape as the corresponding second inlet-outlet 61b, and is disposed in a manner of facing the corresponding second inlet-outlet 61b. The second communication portions 23b serve as inlet-outlets of the compression chamber 22.

The displacer piston 3 and the power piston 4 are coaxially disposed in the cylinder 2. The displacer piston 3 divides a space defined by the cylinder 2 and the power piston 4 into two in the up-down direction. In other words, the displacer piston 3 constitutes the expansion chamber 21 formed above the displacer piston 3 and the compression chamber 22 formed between the displacer piston 3 and the power piston 4. An internal space of the expansion chamber 21 and the compression chamber 22 (that is, the working space 20) is in communication with an internal space of the heat exchanger 6 via the plurality of first communication portions 23a and the plurality of second communication portions 23b, and has substantially the same pressure as an internal pressure of the heat exchanger 6. Thus, the expansion chamber 21 and the compression chamber 22 communicate with each other via the heat exchanger 6, and the working gas repeatedly reciprocates between the expansion chamber 21 and the compression chamber 22 through the heat exchanger 6 by the movement of the displacer piston 3 described later.

The displacer piston 3 and the power piston 4 are connected to a crankshaft 10 via different connecting rods 30 and 40 respectively such that the power piston 4 has a phase of moving in the lead by 90 degrees (a phase difference of 90 degrees), and the power piston 4 outputs a rotational force to the piston crank mechanism 5 via the connecting rod 40. The crankshaft 10 is coupled to an output shaft 16 of a recoil starter 15 via a coupling 14.

The displacer piston 3 is used to move the working gas in the cylinder 2, and moves the working gas in the cylinder 2 to change a volume ratio between the expansion chamber 21 and the compression chamber 22. For example, when a large amount of high-temperature working gas exists in the expansion chamber 21, the internal pressure of the cylinder 2 is high, and when a large amount of low-temperature working gas exists in the compression chamber 22, the internal pressure of the cylinder 2 is low. In accordance with timings of this pressure fluctuation, when the pressure is high, the power piston 4 is pushed down from near the top dead center to obtain a shaft rotational force to be output to the piston crank mechanism 5, and when the pressure is low, the power piston 4 is pushed up by the piston crank mechanism 5. By repeating such an operation, a continuous rotational force can be obtained.

As described above, the Stirling engine 1 constitutes a Stirling cycle in which the working gas is moved between the expansion chamber 21 and the compression chamber 22 via the heat exchanger 6 to repeat the volume change of the expansion chamber 21 and the compression chamber 22, thereby performing conversion between heat and mechanical power.

[Heat Exchanger]

Figure 2:
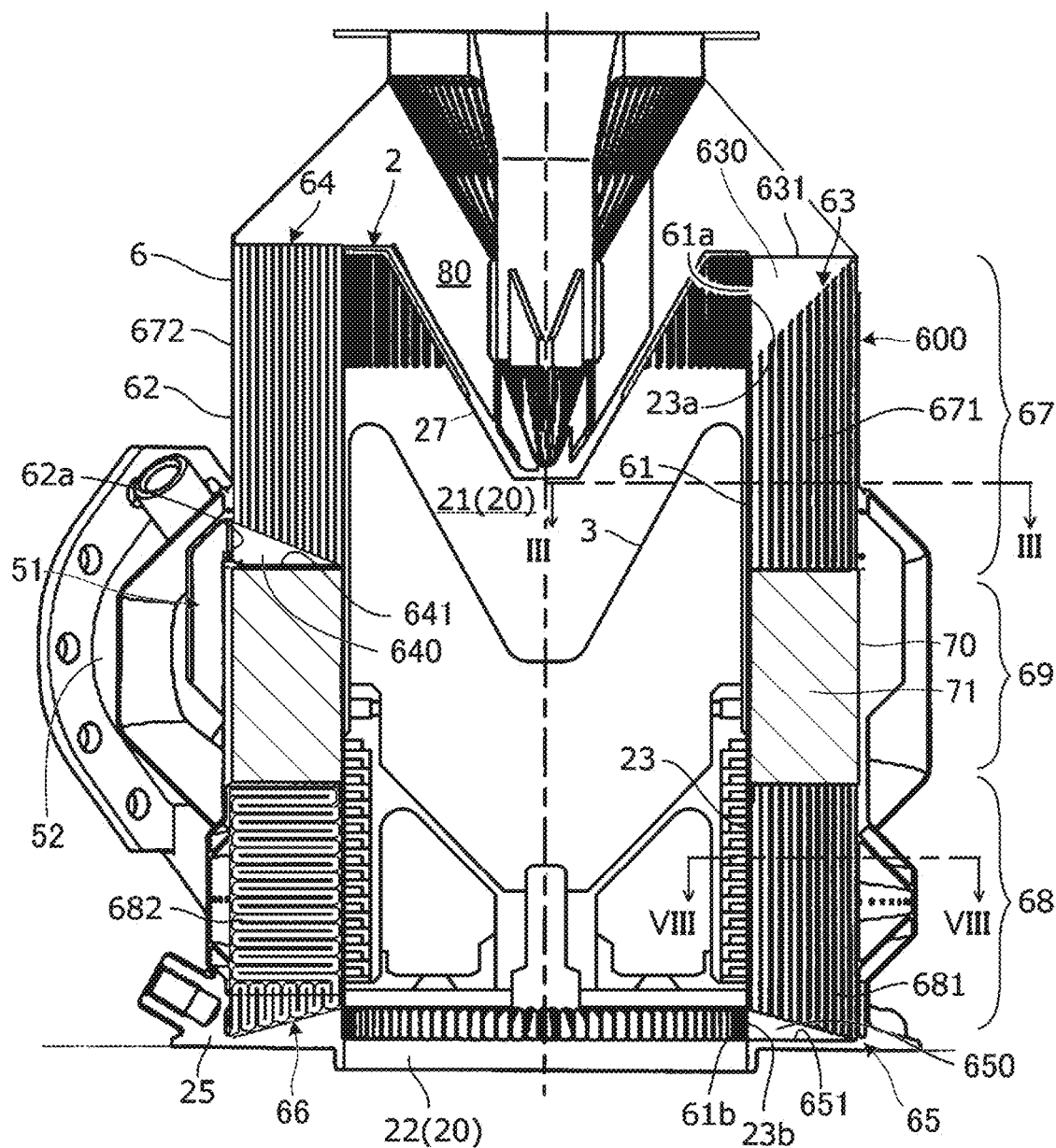
FIG. 2 is a cross-sectional view illustrating a configuration of main parts of a heat exchanger 6.

As illustrated in FIG. 2, the heat exchanger 6 is provided in a double cylindrical shape extending in the axial direction (that is, the up-down direction) along the outer peripheral surface of the first cylinder 23, and has an inner peripheral wall 61 provided on an inner peripheral side and an outer peripheral wall 62 provided on an outer peripheral side.

The heat exchanger 6 includes a heater 67 that is provided on the expansion chamber 21 side and performs heat exchange between the working gas and a heat source fluid, a cooler 68 that is provided on the compression chamber 22 side and performs heat exchange between the working gas and a cooling fluid, and a regenerator 69 that is disposed between the heater 67 and the cooler 68 and is capable of storing heat of the working gas. For example, the heat source fluid is a high-temperature gas (for example, high-temperature air), and the cooling fluid is a low-temperature liquid (for example, cooling water).

The heater 67, the regenerator 69, and the cooler 68 are disposed between the inner peripheral wall 61 and the outer peripheral wall 62, and are connected in series in the axial direction of the cylinder 2.

The heater 67, the regenerator 69, and the cooler 68 are provided with a communication path 600 through which the expansion chamber 21 and the compression chamber 22 communicate with each other and through which the working gas is circulated. The communication path 600 includes a plurality of working gas flow channels 671 of the heater 67, an internal space of the regenerator 69, and working gas flow channels 681 of the cooler 68, which will be described later.

[Heater]

Figure 3:
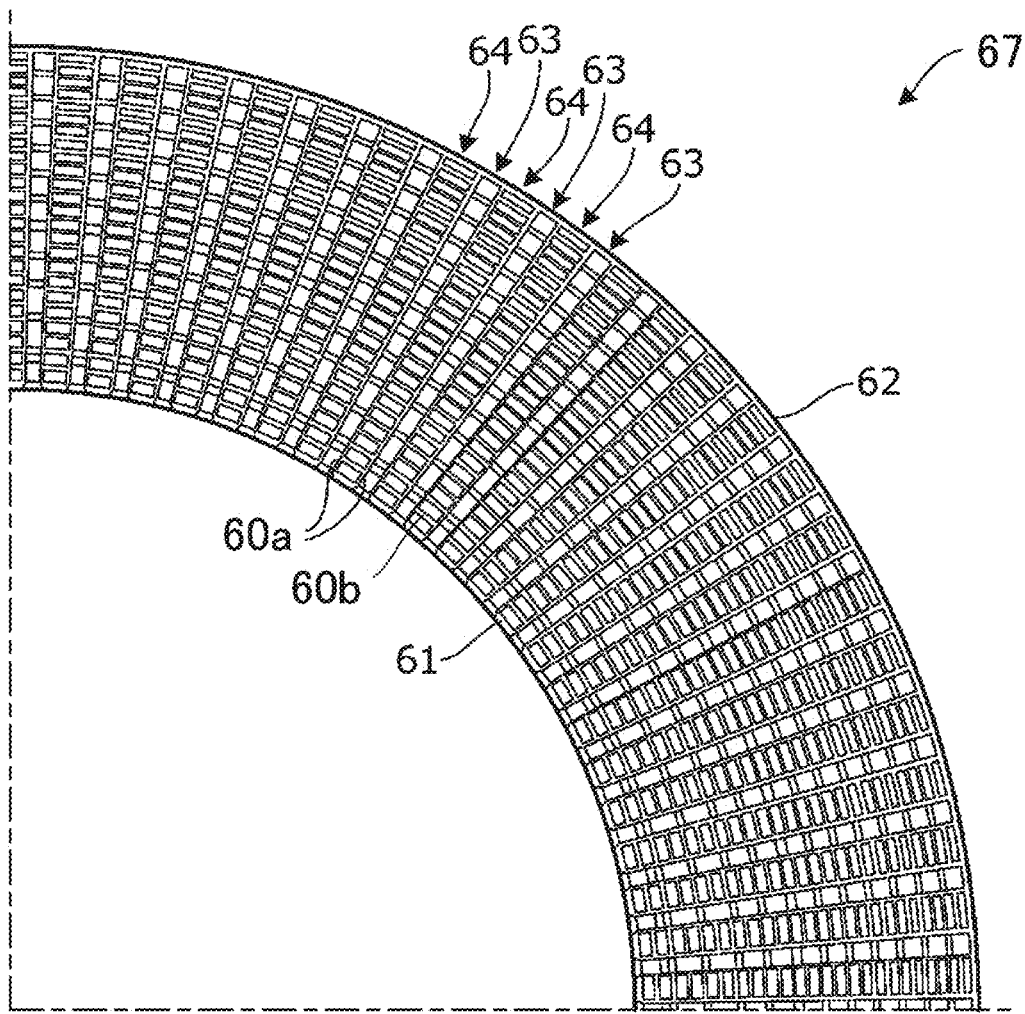
FIG. 3 is a cross-sectional view taken along a line III-III in FIG. 2.

As illustrated in FIG. 3, the heater 67 includes a plurality of first partition walls 60a that are provided at predetermined intervals in a circumferential direction and extend in a radial direction, and a plurality of second partition walls 60b that connect facing surfaces of the first partition walls 60a and extend in a flow direction of the working gas and the heat source fluid (that is, the up-down direction).

In the heater 67, working gas circulation layers 63 for circulating the working gas and heat source fluid circulation layers 64 for circulating the heat source fluid are alternately formed in the circumferential direction across the first partition wall 60a. The heater 67 is a plate-type heat exchanger that performs heat exchange between the working gas and the heat source fluid via the first partition wall 60a. In the present embodiment, since the temperature of the heat source fluid is higher than that of the working gas, the heater 67 heats the working gas going into and out of the expansion chamber 21 via the first communication portion 23a of the first cylinder 23.

As illustrated in FIG. 2, the first inlet-outlet 61a is provided at an upper end of the inner peripheral wall 61 where the working gas circulation layer 63 is positioned. The first inlet-outlet 61a is formed in a slit shape having substantially the same shape as the corresponding first communication portion 23a, and is disposed facing the corresponding first communication portion 23a of the first cylinder 23. In the heat exchanger 6, the first inlet-outlet 61a serves as an inlet-outlet to the expansion chamber 21 of the cylinder 2.

An upper end 631 of the working gas circulation layer 63 is closed, and a lower end thereof is open to be in communication with the regenerator 69. The direction in which the working gas flowing through the working gas circulation layer 63 flows one time during one rotation of the crankshaft 10 due to the movement of the displacer piston 3 changes to the opposite direction.

An upper end of the heat source fluid circulation layer 64 is open and communicates with a heat source fluid introduction chamber 80. The heat source fluid supplied from the outside is introduced into the heat source fluid circulation layer 64 through the heat source fluid introduction chamber 80. Accordingly, the heat source fluid is introduced into the heat source fluid circulation layer 64 from above. Details of the heat source fluid introduction chamber 80 will be described later.

An outlet 62a is provided in the outer peripheral wall 62 positioned at a lower end of the heat source fluid circulation layer 64. The outlet 62a is formed in a slit shape, is disposed facing the corresponding heat source fluid circulation layer 64, and guides the heat source fluid to a heat source fluid discharge channel 51 provided on the outer side of the heat source fluid circulation layer 64 in the radial direction. An abutting portion 641 is provided at the lower end of the heat source fluid circulation layer 64. The abutting portion 641 is provided along a lower end of the outlet 62a of the outer peripheral wall 62, and guides the heat source fluid to the outlet 62a.

The heat source fluid discharge channel 51 is provided substantially at the center of the heat exchanger 6 in the up-down direction, and extends along the circumferential direction of the heat exchanger 6. The heat source fluid discharge channel 51 is provided with a discharge portion 52, and the heat source fluid guided from each outlet 62a to the heat source fluid discharge channel 51 is discharged from the discharge portion 52 to the outside of the heat exchanger 6.

To describe an inner structure of the working gas circulation layer 63 and the heat source fluid circulation layer 64 in more detail, the heater 67 includes a plurality of working gas flow channels 671 that are provided in the working gas circulation layer 63 and through which the working gas is circulated, and a plurality of heat source fluid flow channels 672 that are provided in the heat source fluid circulation layer 64 and through which the heat source fluid is circulated. Each working gas flow channel 671 and each heat source fluid flow channel 672 are defined and formed by the first partition wall 60a and the second partition wall 60b. The first partition wall 60a and the second partition wall 60b that define and form each flow channel may be collectively referred to as a partition wall 60.

Figure 4:
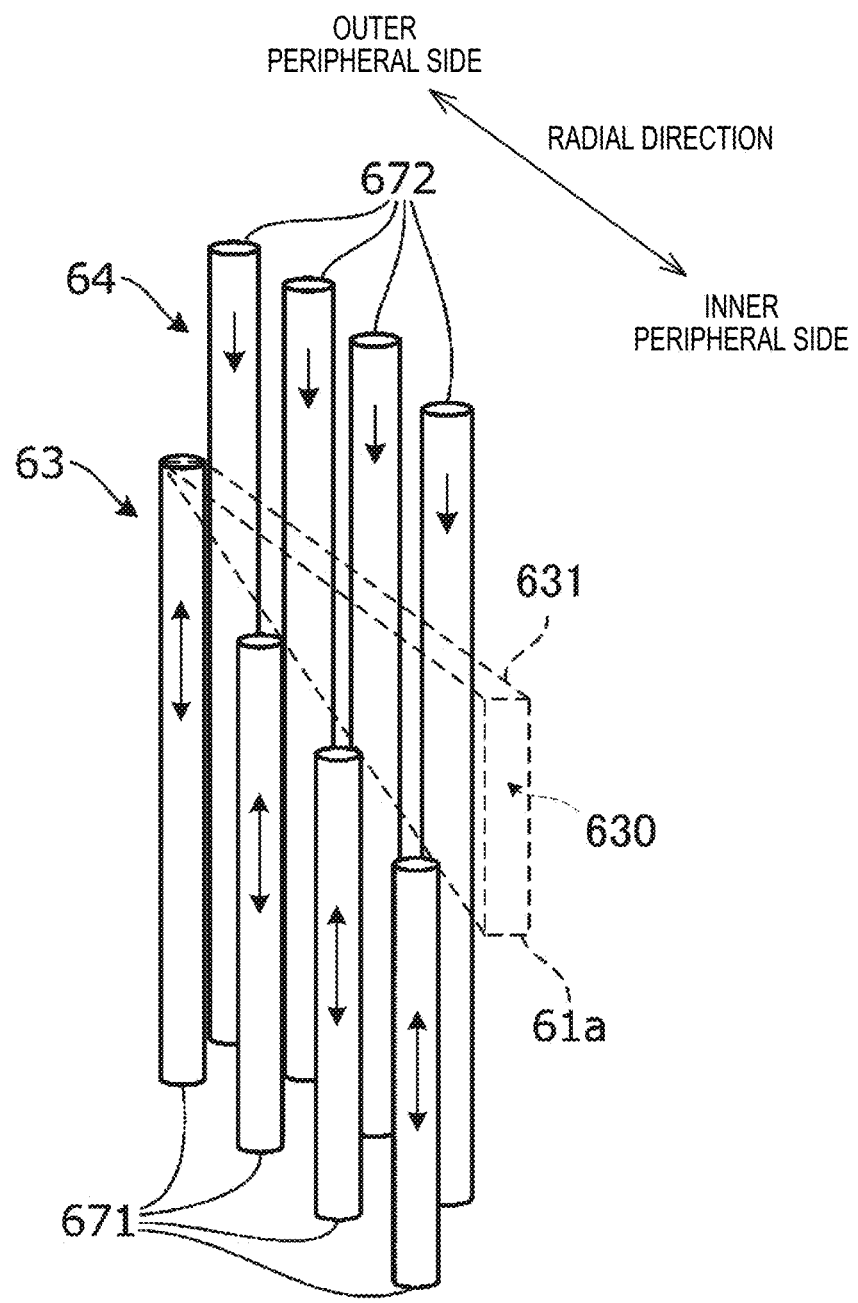
FIG. 4 is a diagram schematically illustrating a working gas flow channel 671 and a heat source fluid flow channel 672 provided in a heater 67.

FIG. 4 is a diagram schematically illustrating the working gas flow channel 671 and the heat source fluid flow channel 672, and illustration of the partition wall 60 is omitted in FIG. 4. The working gas flow channel 671 extends in the up-down direction, and an upper end thereof communicates with the expansion chamber 21 via a space 630 and the first inlet-outlet 61a described later, and a lower end thereof communicates with the regenerator 69. In each working gas circulation layer 63, a plurality of working gas flow channels 671 are disposed in parallel along the radial direction. The working gas flows in a counter flow to the heat source fluid when flowing from the lower end to the upper end of the working gas flow channel 671, and the working gas flows in a parallel flow with the heat source fluid when flowing from the upper end to the lower end.

The upper end of the working gas flow channel 671 is positioned farther from the closed upper end 631 of the working gas circulation layer 63 as the working gas flow channel 671 is positioned closer to the first inlet-outlet 61a (that is, on the inner peripheral side). That is, the working gas discharged from the working gas flow channel 671 positioned closer to the first inlet-outlet 61a is discharged at a position farther from the upper end 631 of the working gas circulation layer 63.

In each working gas circulation layer 63 of the heater 67, the space 630 defined by the upper end 631 and the upper ends of the plurality of working gas flow channels 671 has a substantially triangular shape in a side view. The space 630 is a portion where the flow of the working gas flowing out of the working gas flow channel 671 is bent toward the first inlet-outlet 61a. The space 630 has a shape in which a flow channel cross section thereof gradually increases from the outer peripheral side toward the inner peripheral side, and therefore, flow velocities at respective positions are equal and a pressure loss can be minimized. By setting a maximum area of the first inlet-outlet 61a to be equal to the sum of cross-sectional areas of the plurality of working gas flow channels 671, the pressure loss of the heat exchanger 6 including the first inlet-outlet 61a can be minimized.

Figure 5:
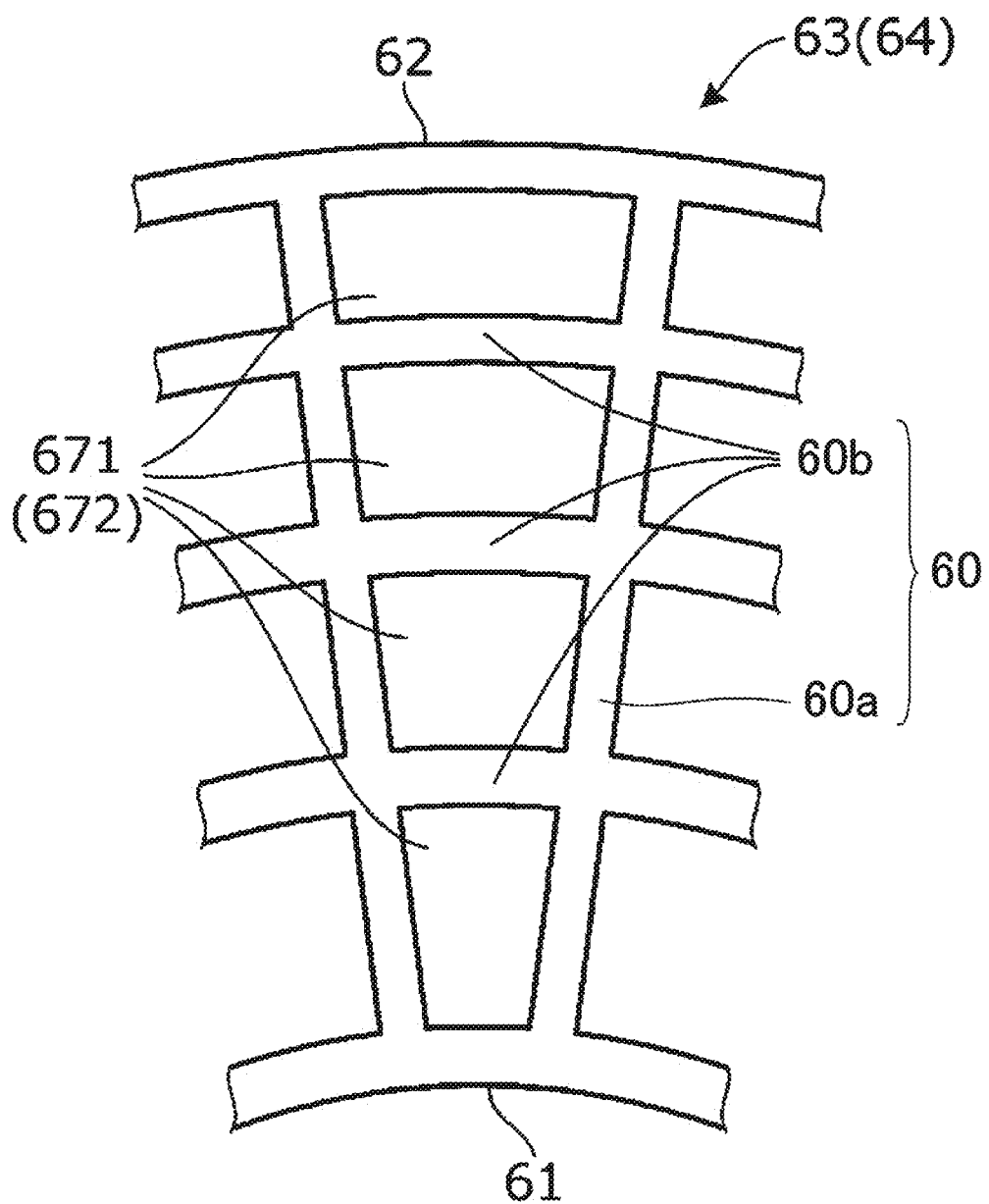
FIG. 5 is a diagram schematically illustrating a cross section of the working gas flow channel 671 and the heat source fluid flow channel 672 of the heater 67 that are defined and formed by a partition wall 60.

FIG. 5 is a diagram schematically illustrating a plurality of working gas flow channels 671 provided in each working gas circulation layer 63. As illustrated in FIG. 5, the plurality of working gas flow channels 671 are defined and formed by the first partition wall 60a and the second partition wall 60b. At this time, the plurality of working gas flow channels 671 are partitioned by the second partition wall 60b so as to have the same equivalent diameter. By making the equivalent diameters of the respective working gas flow channels 671 equal, a pressure loss coefficient and a heat transfer coefficient become equal, and a drift of the working gas flowing through the respective working gas flow channels 671 is eliminated. By eliminating the drift of the working gas flowing through the working gas flow channel 671, the overall pressure loss is reduced, and the heat transfer performance is improved.

Returning to FIG. 2, the heat source fluid flow channel 672 extends in the up-down direction of the heat exchanger 6, and has an upper end communicating with the heat source fluid introduction chamber 80 and a lower end communicating with the heat source fluid discharge channel 51 via a space 640 and the outlet 62a described later. In each heat source fluid circulation layer 64, a plurality of heat source fluid flow channels 672 are disposed in parallel along the radial direction.

The lower end of the heat source fluid flow channel 672 is positioned farther from the abutting portion 641 as the heat source fluid flow channel 672 is positioned closer to the outlet 62a (that is, on the outer peripheral side). That is, the heat source fluid discharged from the heat source fluid flow channel 672 positioned closer to the outlet 62a is discharged at a position farther from the abutting portion 641.

In each heat source fluid circulation layer 64, the space 640 defined by the abutting portion 641 and the lower ends of the plurality of heat source fluid flow channels 672 has a substantially triangular shape in a side view. The space 640 is a portion where the flow of the heat source fluid flowing out of the heat source fluid flow channel 672 is bent toward the outlet 62a. The space 640 has a shape in which a flow channel cross section thereof gradually increases from the inner peripheral side toward the outer peripheral side, and therefore, flow velocities at respective positions are equal and a pressure loss can be minimized.

As indicated by the reference signs in parentheses in FIG. 5, a plurality of heat source fluid flow channels 672 provided in each heat source fluid circulation layer 64 are also defined and formed by the first partition wall 60a and the second partition wall 60b similarly to the working gas flow channels 671.

In the present embodiment, the heat conductivity of the heat source fluid is lower than the heat conductivity of the working gas, and the heat transfer coefficient in a flow in which the heat source fluid flows through the heat source fluid flow channel 672 is smaller than the heat transfer coefficient in a flow in which the working gas flows through the working gas flow channel 671. In other words, the heat resistance according to the heat transfer of the heat source fluid (hereinafter, also simply referred to as the heat resistance on the heat source fluid side) is larger.

Figure 6A:
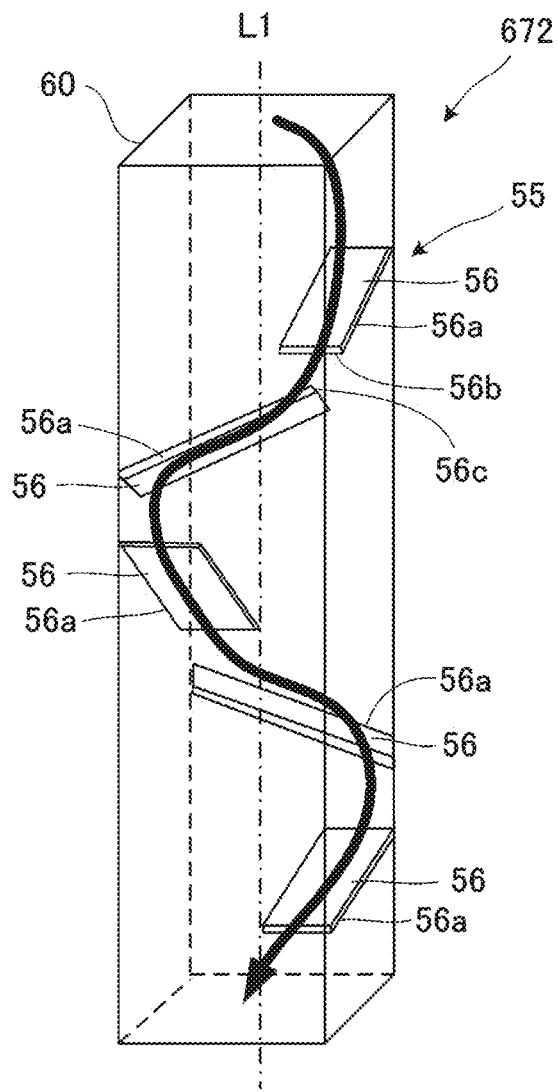
FIG. 6A is a diagram illustrating a spiral flow generation portion 55 provided in the working gas flow channel 671 of the heater 67.
Figure 6B:
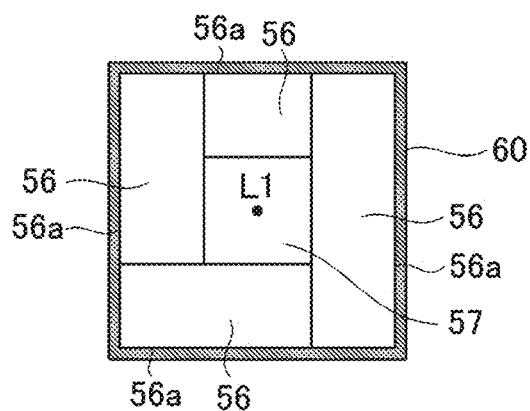
FIG. 6B is a diagram illustrating the working gas flow channel 671 as viewed from a flow direction of a heat source fluid.

As illustrated in FIGS. 6A and 6B, the heat source fluid flow channel 672 is provided with a spiral flow generation portion 55 that generates a spiral flow (indicated by a solid arrow in FIG. 6A) along the flow direction of the heat source fluid (that is, a downward direction). Accordingly, a tornado-like vortex is generated along the flow direction of the heat source fluid, and the heat source fluid flowing through the heat source fluid flow channel 672 is stirred. Therefore, the heat resistance on the heat source fluid side is reduced, and the heat transfer performance of the working gas and the heat source fluid via the partition wall 60 is improved.

Specifically, the spiral flow generation portion 55 includes a plurality of fins 56 erected from the partition wall 60. The plurality of fins 56 are disposed at predetermined intervals along the flow direction of the heat source fluid, and are spirally provided around a central axis L1 of the flow channel cross section of the heat source fluid flow channel 672. FIGS. 6A and 6B illustrate an example in which the flow channel cross section of the heat source fluid flow channel 672 has a rectangular shape, and the plurality of fins 56 are spirally provided at intervals of 90 degrees in the circumferential direction along the central axis L1. The flow channel cross section of the heat source fluid flow channel 672 may be any shape. The angular interval in the circumferential direction of the plurality of fins 56 is not limited to 90 degrees. It is sufficient that the fins are provided spirally at angular intervals of 30 degrees or greater and 180 degrees or smaller in the circumferential direction.

Each fin 56 has a base end 56a connected to the partition wall 60. The base end 56a is connected to the partition wall 60 in a manner of inclining at a predetermined angle with respect to a plane perpendicular to the central axis L1 so as to generate a spiral flow of the heat source fluid. As compared with a case where the fins 56 are not provided, the pressure loss of the heat source fluid flowing through the heat source fluid flow channel 672 is increased due to provision of the fins 56, but the degree of increase in the pressure loss can be reduced by connecting the fins 56 to the partition wall 60 in a manner of inclining at a predetermined angle. Even when a foreign matter enters the heat source fluid flow channel 672 together with the heat source fluid, the foreign matter is less likely to accumulate on the fins 56, and thus it is possible to prevent clogging of the heat source fluid flow channel 672.

The fins 56 adjacent to each other in the flow direction of the heat source fluid are provided at positions not overlapping each other in the flow direction. In other words, a downstream end 56b of the fin 56 positioned upstream is positioned upstream of an upstream end 56c of the fin 56 positioned downstream. Accordingly, the degree of increase in the pressure loss when the heat source fluid flows through the heat source fluid flow channel 672 can be further reduced. Further, it is possible to further prevent clogging of the heat source fluid flow channel 672 involving entry of a foreign matter.

As illustrated in FIG. 6B, the heat source fluid flow channel 672 includes a through region 57, in which the fins 56 are not disposed, as viewed from the flow direction of the heat source fluid. In the present embodiment, as viewed from the flow direction of the heat source fluid, a region including the central axis L1 of the heat source fluid flow channel 672 is the through region 57. Accordingly, the degree of increase in the pressure loss when the heat source fluid flows through the heat source fluid flow channel 672 can be further reduced.

As described above, when the spiral flow generation portion 55 is provided in the flow channel, the heat transfer coefficient increases and the heat resistance decreases. On the other hand, as compared with a case where the spiral flow generation portion 55 is not provided, the pressure loss of the fluid increases, and the output performance of the Stirling engine 1 may be affected. Accordingly, it is preferable to determine whether to provide the spiral flow generation portion 55 in the flow channel in consideration of the balance between the effect of the decrease in the heat resistance and the influence of the increase in the pressure loss due to providing the spiral flow generation portion 55 in the flow channel.

Among the working gas, the heat source fluid, and the cooling fluid flowing through the heat exchanger 6, the working gas and the cooling fluid have high heat conductivity. Further, the heat transfer coefficient in a flow in which the working gas flows through the working gas flow channel 671 of the heater 67 and the working gas flow channel 681 of the cooler 68 described later, and the heat transfer coefficient in a flow in which the cooling fluid flows through the cooling fluid flow channel 682 of the cooler 68 described later are all large. Thus, the heat resistance on the working gas side and the cooling fluid side is small. At this time, the effect of reducing the heat resistance by providing the spiral flow generation portion 55 in the working gas flow channel 671 of the heater 67 and the working gas flow channel 681 and the cooling fluid flow channel 682 of the cooler 68 is relatively insignificant. Accordingly, in consideration of the influence of the increase in the pressure loss, it is preferable that the spiral flow generation portion 55 is not provided in the working gas flow channel 671 of the heater 67 and the working gas flow channel 681 and the cooling fluid flow channel 682 of the cooler 68.

On the other hand, as described above, the heat resistance on the heat source fluid side is large, and the effect of reducing the heat resistance by providing the spiral flow generation portion 55 in the heat source fluid flow channel 672 is significant. Accordingly, even in consideration of the influence of the increase in the pressure loss, it is preferable to improve the heat transfer performance by providing the spiral flow generation portion 55 in the heat source fluid flow channel 672.

Figure 7A:
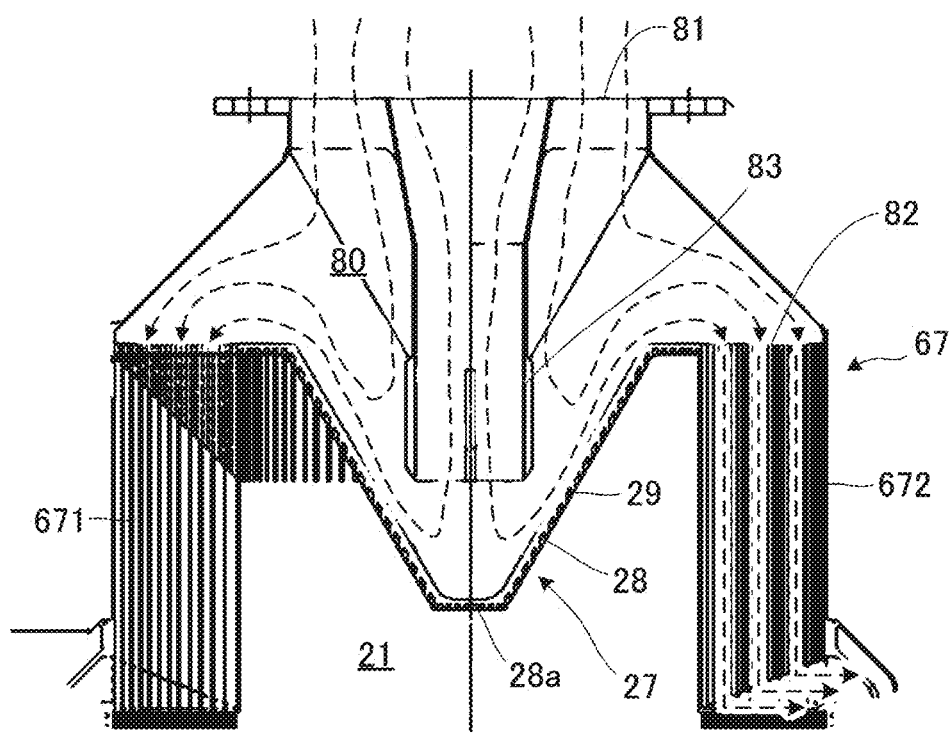
FIG. 7A is a diagram illustrating a flow (indicated by broken lines) of a heat source fluid flowing in a heat source fluid introduction chamber 80.

Next, the heat source fluid introduction chamber 80 will be described with reference to FIGS. 7A and 7B. The heat source fluid introduction chamber 80 is provided on the outer side (the upper side in the present embodiment) of the expansion chamber 21, and the heat source fluid introduction chamber 80 and the expansion chamber 21 are partitioned from each other by the ceiling wall 27 of the cylinder 2.

The heat source fluid introduction chamber 80 includes an introduction port 81 through which the heat source fluid is introduced from the outside into the heat source fluid introduction chamber 80, and a guide port 82 serving as an inlet of the heat source fluid from the heat source fluid introduction chamber 80 to the heat source fluid flow channel 672. The introduction port 81 is provided in an upper end of the heat source fluid introduction chamber 80, and the guide port 82 is provided in communication with the upper end of the heat source fluid flow channel 672.

Since the heat source fluid introduction chamber 80 and the expansion chamber 21 are partitioned from each other by the ceiling wall 27, the heat exchange between the heat source fluid flowing through the heat source fluid introduction chamber 80 and the working gas flowing through the expansion chamber 21 is performed via the ceiling wall 27. Accordingly, the working gas on the expansion chamber 21 side is subjected to heat exchange with the heat source fluid not only when the working gas flows through the working gas flow channel 671 but also when the working gas is present in the expansion chamber 21, and therefore, a large amount of heat energy can be taken in from the heat source fluid.

The ceiling wall 27 is provided with a plurality of grooves 29 on the expansion chamber 21 side. The plurality of grooves 29 are not a result of surface roughness formed at the time of manufacturing but formed by design. Although FIG. 7B illustrates an example in which the plurality of grooves 29 are provided on the expansion chamber 21 side, the plurality of grooves 29 may be provided on the outer side of the expansion chamber 21, that is, on the heat source fluid introduction chamber 80 side, or may be provided on both the expansion chamber 21 side and the heat source fluid introduction chamber 80 side.

The plurality of grooves 29 are provided in the entire region of the ceiling wall 27 and extend from a center side of the ceiling wall 27 toward an outer peripheral side (the heater 67 side).

Since a surface area of the ceiling wall 27 is increased by providing the plurality of grooves 29 in the ceiling wall 27, the working gas can take more heat energy from the heat source fluid, and the heat exchange efficiency between the working gas and the heat source fluid via the ceiling wall 27 is improved. As a result, the heat efficiency and output performance of the Stirling engine 1 can be improved. The plurality of grooves 29 are not necessarily provided in the entire region of the ceiling wall 27, and may be provided in parts of the ceiling wall 27.

Figure 7B:
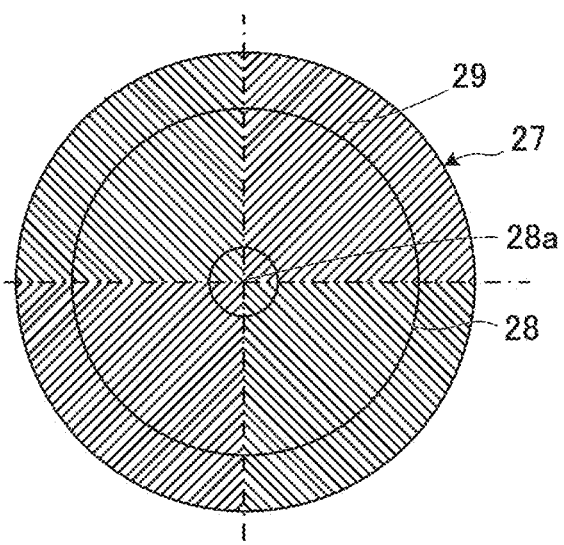
FIG. 7B is a diagram illustrating a ceiling wall 27 as viewed from an expansion chamber 21 side.

FIG. 7B illustrates an example in which the plurality of grooves 29 linearly extend from the center side to the outer peripheral side, and the present invention is not limited thereto. The plurality of grooves 29 may extend from the center side to the outer peripheral side in, for example, a zigzag shape (a shape in which the extending direction thereof changes in the middle), or may extend from the center side to the outer peripheral side in a curved shape. Further, depending on the position of the ceiling wall 27, the plurality of grooves 29 may be a combination of linear, zigzag, and curved grooves. Thus, more heat energy can be taken in by appropriately changing the shape of the plurality of grooves 29.

The ceiling wall 27 is provided with a substantially conical protruding portion 28 protruding toward the expansion chamber 21. The protruding portion 28 is formed by recessing a portion of the ceiling wall 27 toward the expansion chamber 21, and is provided such that a central axis thereof coincides with the central axis of the cylinder 2. Since the protruding portion 28 is provided on the ceiling wall 27, the surface area of the ceiling wall 27 can be increased as compared with a case where the ceiling wall 27 is formed in a flat plate shape. Accordingly, the heat energy taken in by the working gas can be further increased, and the heat exchange efficiency between the working gas and the heat source fluid via the ceiling wall 27 is further improved. Further, by providing the protruding portion 28, the pressure resistance of the ceiling wall 27 is also increased.

The heat source fluid introduction chamber 80 is provided with a guide portion 83 that guides the heat source fluid toward an apex part 28a of the protruding portion 28 of the ceiling wall 27. The guide portion 83 extends along the central axis of the protruding portion 28 to a position overlapping the protruding portion 28 in the axial direction of the cylinder 2. As indicated by broken lines in FIG. 7A, the guide portion 83 guides the heat source fluid flowing in from the introduction port 81 to the apex part 28a of the ceiling wall 27. The heat source fluid guided to the apex part 28a by the guide portion 83 flows along the substantially conical protruding portion 28 to the outer side in the radial direction, and is introduced into the heat source fluid flow channel 672 from the guide port 82. Accordingly, the heat source fluid easily flows along the ceiling wall 27, and the heat exchange efficiency between the working gas and the heat source fluid via the ceiling wall 27 can be further improved.

Since the plurality of grooves 29 extend from the apex part 28a of the protruding portion 28 toward the heater 67 side, the heat source fluid can smoothly flow from the apex part 28a toward the heater 67 side.

[Cooler]

Figure 8:
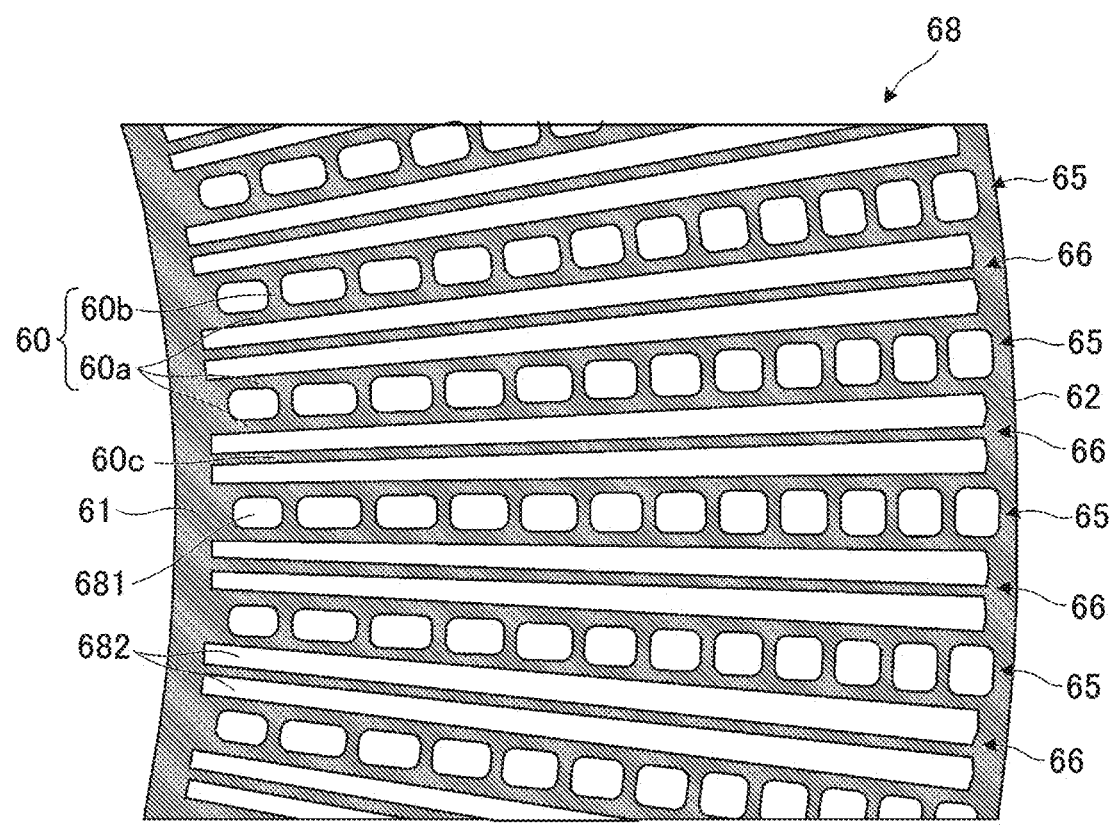
FIG. 8 is a cross-sectional view taken along a line VIII-VIII in FIG. 2.

As illustrated in FIG. 8, similarly to the heater 67, the cooler 68 includes a plurality of first partition walls 60a that are provided at predetermined intervals in the circumferential direction and extend in the radial direction.

As illustrated in FIGS. 2 and 8, in the cooler 68, working gas circulation layers 65 for circulating the working gas and cooling fluid circulation layers 66 for circulating the cooling fluid are alternately formed in the circumferential direction across the first partition wall 60a. The cooler 68 is a plate-type heat exchanger that performs heat exchange between the working gas and the cooling fluid via the first partition wall 60a. In the present embodiment, since the temperature of the cooling fluid is lower than that of the working gas, the cooler 68 cools the working gas flowing into and out of the compression chamber 22 via the second communication portion 23b of the first cylinder 23.

The second inlet-outlet 61b described above is provided at the lower end of the inner peripheral wall 61 where the working gas circulation layer 65 is positioned. The second inlet-outlet 61b is formed in a slit shape having substantially the same shape as the corresponding second communication portion 23b, and is disposed facing the corresponding second communication portion 23b of the first cylinder 23. In the heat exchanger 6, the second inlet-outlet 61b serves as an inlet-outlet to the compression chamber 22 of the cylinder 2.

A lower end 651 of the working gas circulation layer 65 is closed, and an upper end thereof is open to be in communication with the regenerator 69. The direction in which the working gas flowing through the working gas circulation layer 65 flows one time during one rotation of the crankshaft 10 due to the movement of the displacer piston 3 changes to the opposite direction.

To describe an inner structure of the working gas circulation layer 65 and the cooling fluid circulation layer 66 in more detail, the cooler 68 includes a plurality of working gas flow channels 681 that are provided in the working gas circulation layer 65 and through which the working gas is circulated, and a plurality of cooling fluid flow channels 682 that are provided in the cooling fluid circulation layer 66 and through which the cooling fluid is circulated. In the present embodiment, two cooling fluid flow channels 682 are provided side by side in the circumferential direction in each cooling fluid circulation layer 66, and are partitioned by a third partition wall 60c extending in the radial direction. Similarly to the working gas flow channels 671 and the heat source fluid flow channels 672, the working gas flow channels 681 are also defined and formed by the first partition wall 60a and the second partition wall 60b. Since the configuration of the working gas flow channel 681 is similar to the configuration of the working gas flow channel 671 provided in the heater 67, a detailed description thereof will be omitted.

Figure 9:
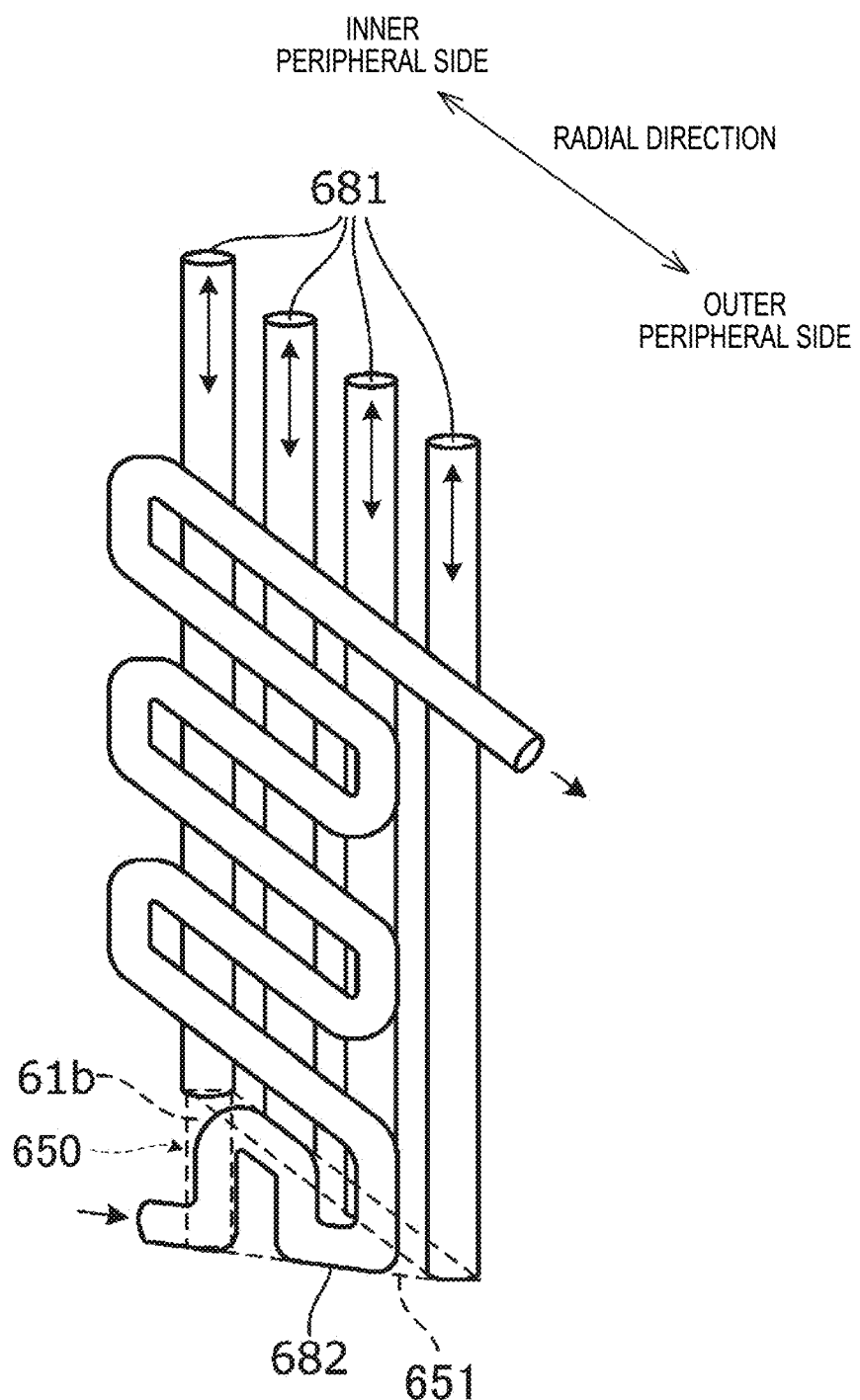
FIG. 9 is a diagram schematically illustrating a working gas flow channel 681 and a cooling fluid flow channel 682 provided in a cooler 68.

FIG. 9 is a diagram schematically illustrating the working gas flow channel 681 and the cooling fluid flow channel 682 provided in the cooler 68. In FIG. 9, the partition wall 60 is not shown.

The working gas flow channel 681 extends in the up-down direction, and a lower end thereof communicates with the compression chamber 22 via a space 650 and the second inlet-outlet 61b described later, and an upper end thereof communicates with the regenerator 69. In each working gas circulation layer 65, a plurality of working gas flow channels 681 are disposed in parallel along the radial direction.

The lower end of the working gas flow channel 681 is positioned farther from the closed lower end 651 of the working gas circulation layer 65 as the working gas flow channel 681 is positioned closer to the second inlet-outlet 61b (that is, on the inner peripheral side). That is, the working gas discharged from the working gas flow channel 681 positioned closer to the second inlet-outlet 61b is discharged at a position farther from the lower end 651 of the working gas circulation layer 65.

Also in the working gas circulation layer 65 of the cooler 68, the space 650 defined by the lower end 651 and the lower ends of the plurality of working gas flow channels 681 has a substantially triangular shape in a side view. Similarly to the plurality of working gas flow channels 671 in each working gas circulation layer 63, the plurality of working gas flow channels 681 in each working gas circulation layer 65 are formed by partitioning a space between a pair of first partition walls 60a by the second partition walls 60b. Therefore, the description of the working gas flow channel 671 is referenced to, and is omitted here.

Each cooling fluid flow channel 682 is formed by folding back a tubular member extending in the radial direction at one end (for example, an end on the outer peripheral side) in the radial direction and then folding back the tubular member at the other end (for example, an end on the inner peripheral side), which is repeated. Each cooling fluid flow channel 682 is formed in a so-called zigzag shape. Each cooling fluid flow channel 682 is formed by bending one flow channel into a folded state instead of being formed with a plurality of linear flow channels, and thus the contact surface of the cooling fluid with the cooling fluid flow channel 682 can be increased.

As illustrated in FIG. 1, the cooling fluid flow channel 682 includes an inlet 683 provided on the lower end side in the up-down direction and an outlet 684 provided on the upper end side, and is configured such that the cooling fluid flows upward as a whole.

When the working gas heated by the heater 67 flows from the upper end side to the lower end side, that is, into the cooler 68, the working gas flowing through the working gas flow channel 681 has a temperature distribution in which the temperature decreases from the upper end side to the lower end side, that is, from the expansion chamber 21 side to the compression chamber 22 side, and the cooling fluid flowing through the cooling fluid flow channel 682 has a temperature distribution in which the temperature increases from the lower end side to the upper end side. In other words, when the working gas flows from the upper end side to the lower end side, the working gas and the cooling fluid flow in the working gas flow channel 681 and the cooling fluid flow channel 682 so as to have a counter flow temperature distribution as a whole, and thus high heat exchange efficiency can be achieved in the cooler 68. Further, since the contact area of the working gas and the cooling fluid is increased by the cooling fluid flow channel 682 formed in the zigzag shape, the heat exchange efficiency is further improved in the cooler 68. When the working gas flows from the lower end side to the upper end side, the working gas and the cooling fluid flow in the working gas flow channel 681 and the cooling fluid flow channel 682 so as to have a parallel flow temperature distribution as a whole.

[Regenerator]

When the working gas moves from the high-temperature expansion chamber 21 to the low-temperature compression chamber 22, the regenerator 69 cools the working gas by taking in the heat energy of the working gas (that is, storing heat). Conversely, when the working gas moves from the low-temperature compression chamber 22 to the high-temperature expansion chamber 21, the regenerator 69 heats the working gas by imparting the stored heat energy to the working gas (that is, releasing heat).

As illustrated in FIG. 2, the regenerator 69 includes a heat storage 71 capable of storing heat of the working gas and a housing 70 surrounding the heat storage 71.

The housing 70 includes the inner peripheral wall 61 and the outer peripheral wall 62 described above, and is provided in a double cylindrical shape. The heat storage 71 is accommodated in an internal space of the housing 70.

In the present embodiment, the heat storage 71 and the housing 70 are continuously connected to each other and provided in one piece. Specifically, the regenerator 69 is an additive manufactured body in which metal powders are accumulated, and the heat storage 71 and the housing 70 are provided in one piece by metal additive manufacturing. According to such a configuration, it is possible to adopt a complicated structure having high heat exchange performance as compared with a conventional regenerator formed by incorporating a metal mesh, a foamed metal, or the like as a heat storage into a housing. Further, the number of assembly steps can be reduced.

Hereinafter, a structure of the heat storage 71 will be described with reference to FIGS. 10 to 15. The structure of the heat storage 71 illustrated in FIGS. 10 to 15 is an example, and the structure of the heat storage 71 can take various shapes. In the following description, an up-down direction in the drawings, that is, a flow direction of the working gas is also referred to as a first direction, and a horizontal direction in the drawings, that is, a direction intersecting the first direction is also referred to as a second direction.

The heat storage 71 includes a plurality of side elements 73, and the plurality of side elements 73 are continuously connected to each other in a three-dimensional manner and provided in one piece.

Figure 10:
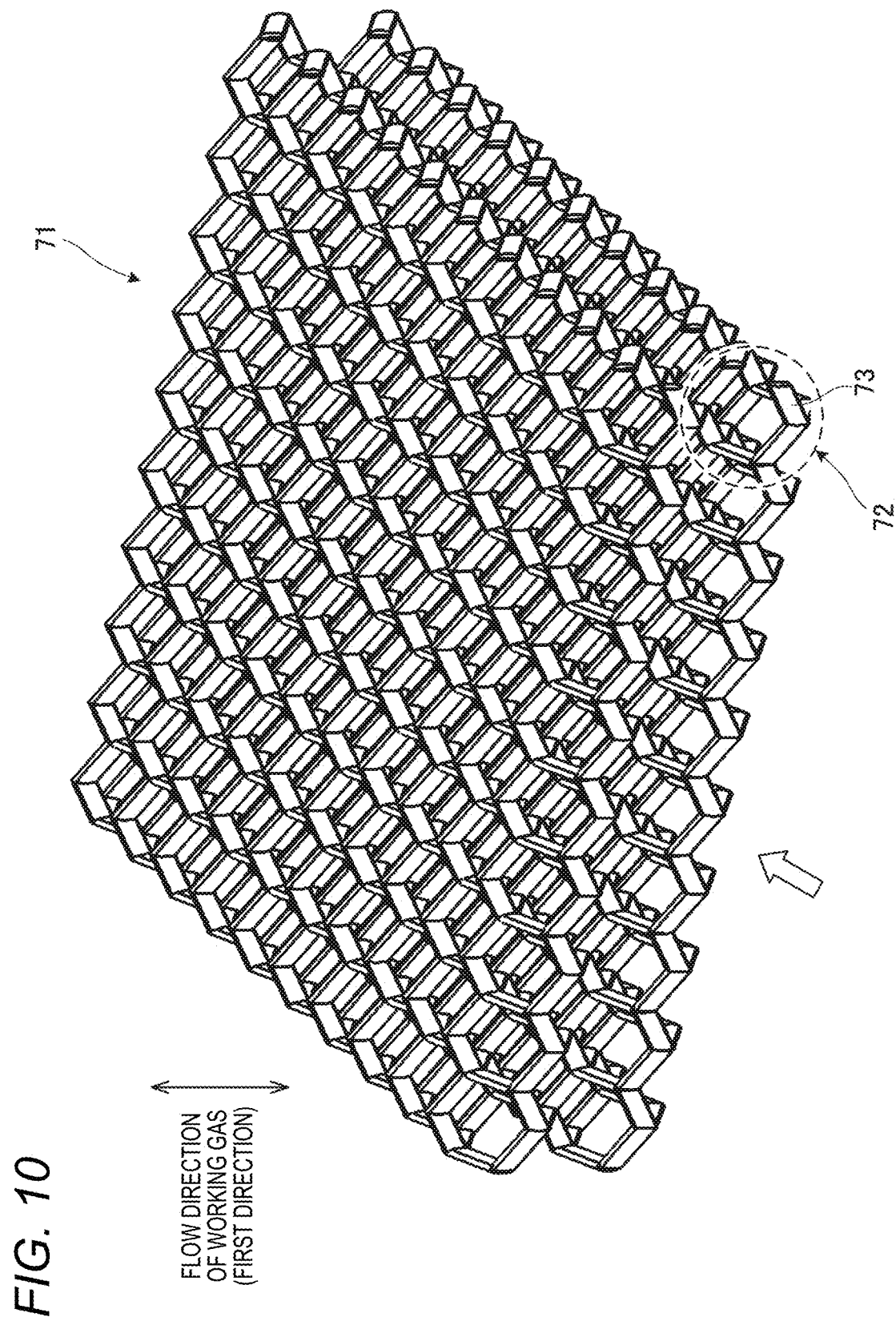
FIG. 10 is a perspective view of a heat storage 71.
Figure 11:
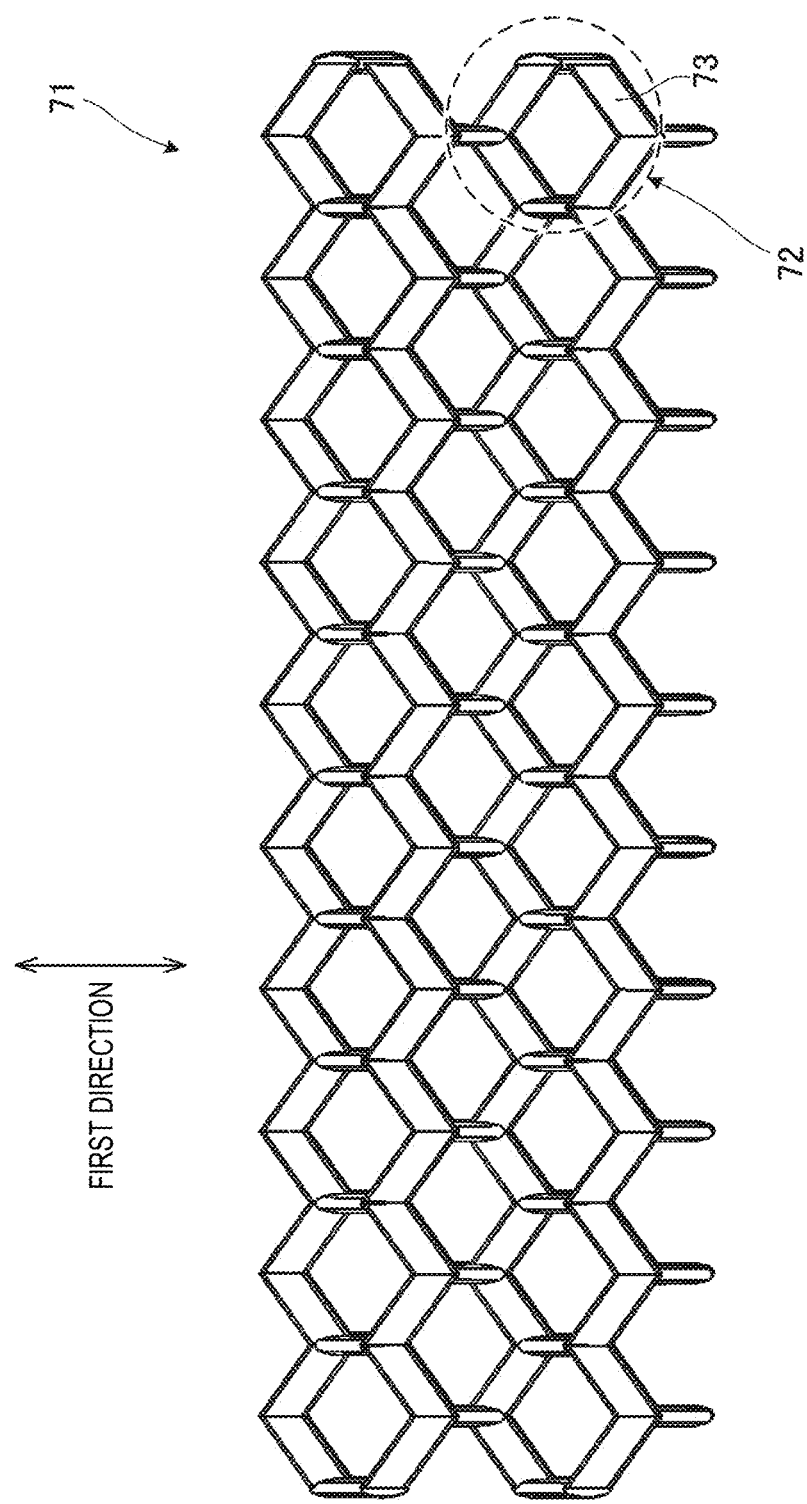
FIG. 11 is a side view of the heat storage 71 as viewed in the direction of a white arrow in FIG. 10.

More specifically, as illustrated in FIGS. 10 and 11, the heat storage 71 includes a plurality of unit structures 72 each formed by connecting a plurality of side elements 73 to each other, and the unit structures 72 are continuously provided in the flow direction of the working gas and the direction intersecting therewith. The example illustrated in FIGS. 10 and 11 illustrates a configuration in which the unit structure 72 has a three-dimensional shape formed by connecting, by the side elements 73, atoms disposed at positions excluding vertices in a unit cell of a diamond structure. The unit structure 72 may have various structures, for example, a structure formed by connecting, by the side elements 73, vertices of a polyhedron such as a regular dodecahedron or a regular icosahedron.

Since the plurality of side elements 73 of the heat storage 71 are continuously connected to each other in a three-dimensional manner and provided in one piece, it is possible to reduce a dead volume which is a volume not involved in heat exchange in the housing 70, and to improve the heat storage performance of the regenerator 69.

Each side element 73 has a plate shape. Each side element 73 has a thickness of, for example, 0.1 mm or less, and is formed finely. Since it is necessary to repeat heat storage and heat release in a short time when exchanging heat energy with the working gas, each side element 73 is finely formed in this manner to reduce its heat capacity.

Figure 12:
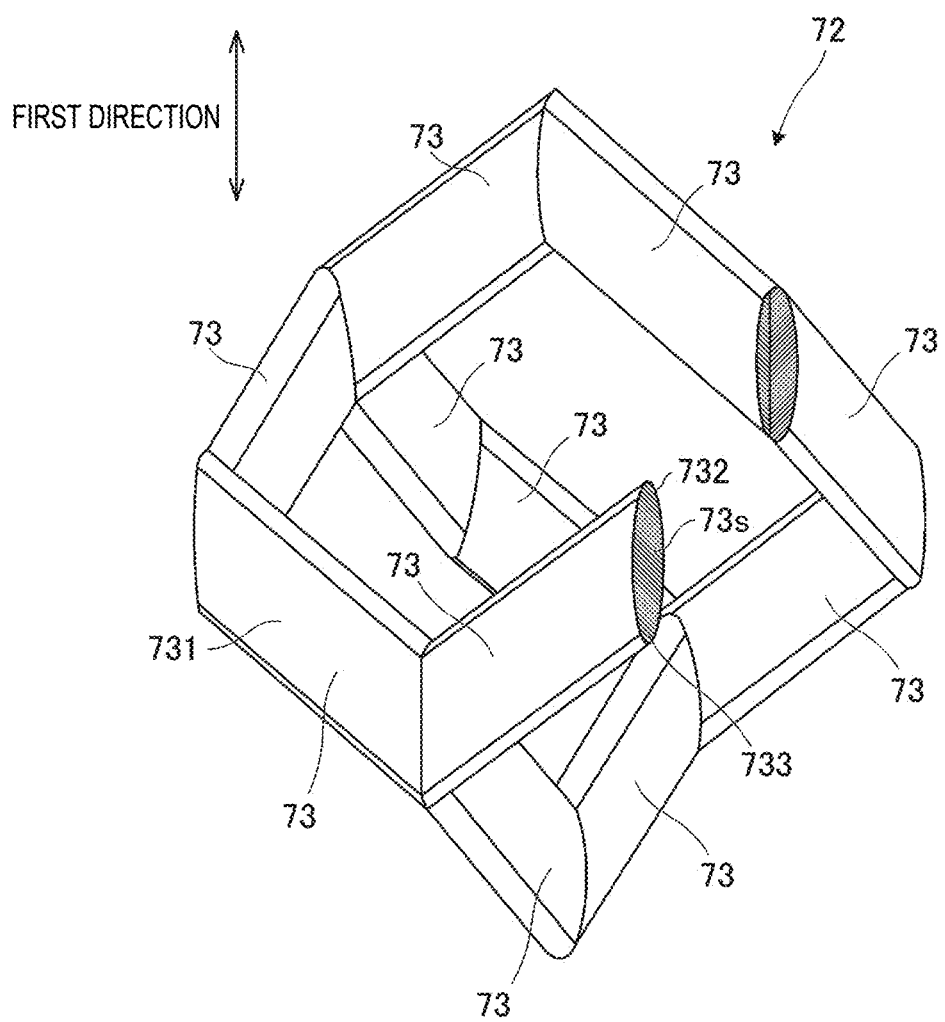
FIG. 12 is a perspective view of a unit structure 72 of the heat storage 71.
Figure 13:
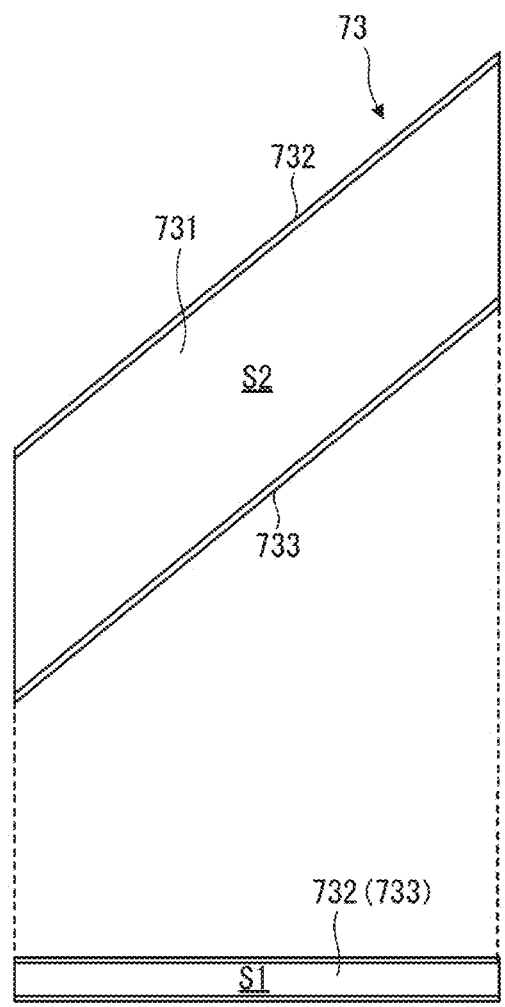
FIG. 13 is a diagram illustrating a side element 73 of the heat storage 71 as viewed from a second direction (upper part) and as viewed from a first direction (lower part).

As illustrated in FIGS. 12 and 13, in each side element 73, a surface 731 having a maximum surface area is provided along the first direction. That is, each side element 73 is provided such that a projected area S2 as viewed from the second direction is larger than a projected area S1 as viewed from the first direction.

Since the projected area S1 in the first direction is small, the flow of the working gas is prevented from being hindered by the side elements 73, and the pressure loss at the time when the working gas flows in the first direction can be reduced. Further, since the projected area S2 in the second direction is large, the contact surface along the flow of the working gas is large, and the heat storage amount of the heat storage 71 can be increased. Accordingly, with the side elements 73, it is possible to achieve both a reduction in pressure loss and an improvement in heat exchange efficiency.

In each side element 73, in a cross section cut along the first direction, an end 732 on the heater 67 side and an end 733 on the cooler 68 side are provided in a curved shape. Specifically, in each side element 73, a cross section 73s cut along the first direction has an elliptical shape as illustrated in FIG. 12, and both ends of the major axis of the ellipse correspond to the ends 732 and 733. Accordingly, it is possible to reduce the pressure loss when the working gas collides with the ends 732 and 733 of each side element 73. The cross section of each side element 73 cut along the first direction is not limited to an elliptical shape, and may be any shape such as a rectangular shape. It is preferable that the ends 732 and 733 are provided in a curved shape or are inclined.

Figure 14:
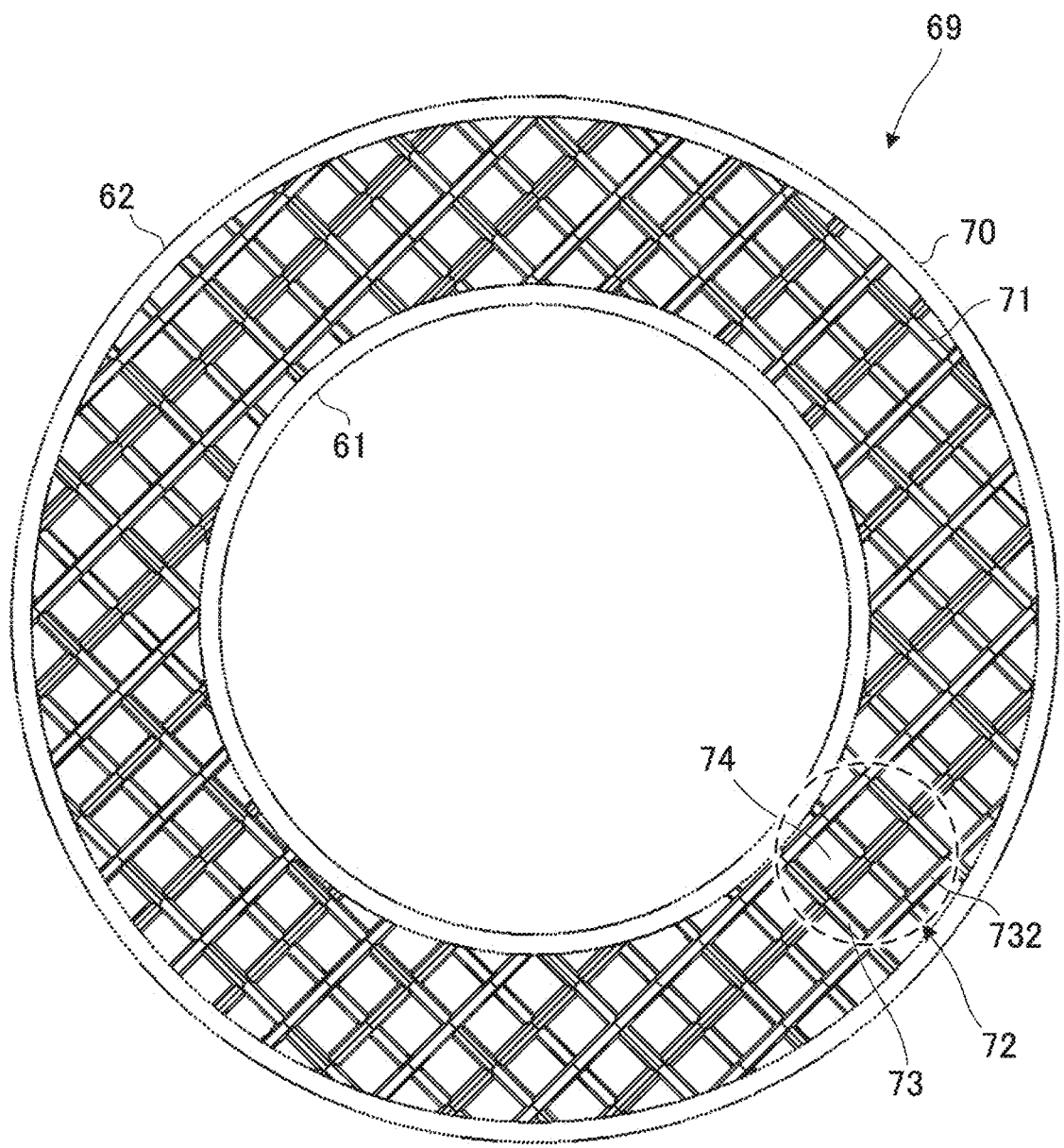
FIG. 14 is a top view of a regenerator 69 in a state where the heat storage 71 is accommodated in a housing 70.
Figure 15:
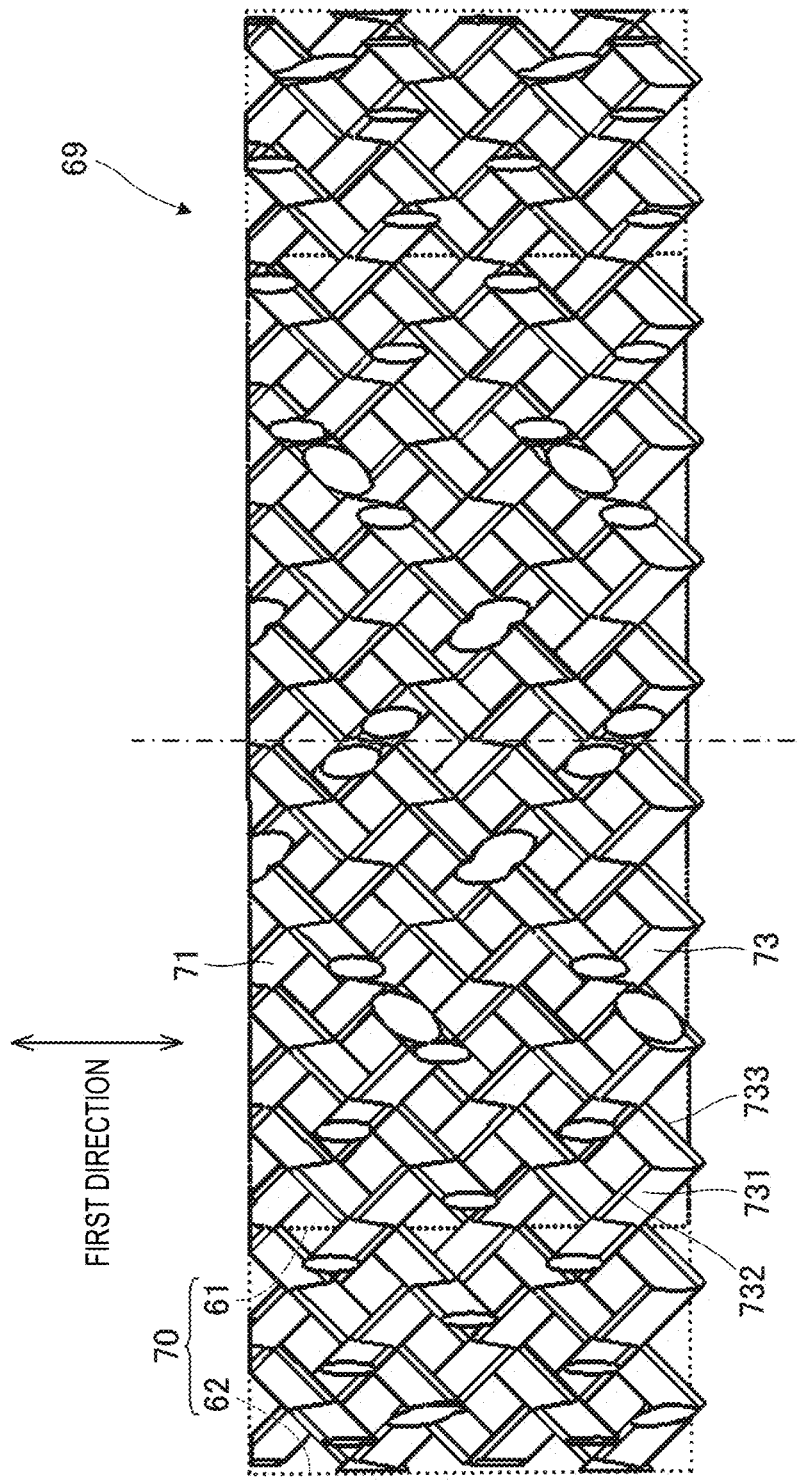
FIG. 15 is a side view of the regenerator 69 in a state where the heat storage 71 is accommodated in the housing 70.

FIGS. 14 and 15 are a top view and a side view of the regenerator 69 in a state where the heat storage 71 is accommodated in the housing 70. In FIG. 15, only a portion in the first direction is illustrated. As illustrated in FIGS. 14 and 15, the heat storage 71 is uniformly disposed in the circumferential direction and the axial direction (first direction) in the housing 70, and as described above, since the housing 70 and the heat storage 71 are continuously connected to each other and provided in one piece, the strength of the regenerator 69 is high.

As illustrated in FIG. 14, as viewed from the first direction, the heat storage 71 includes pass-through portions 74 each of which penetrates from an end on the heater 67 side to an end on the cooler 68 side and that are regularly arranged. Specifically, each of the unit structures 72 has four through parts defined and formed in a lattice shape by the plurality of side elements 73 as viewed from the first direction, and the heat storage 71 having the pass-through portions 74 arranged in a lattice shape between the inner peripheral wall 61 and the outer peripheral wall 62 is formed by continuously providing a plurality of unit structures 72 in the first direction.

In this way, since the heat storage 71 has the pass-through portions 74 penetrating in the first direction, the working gas can smoothly pass through an internal space of the heat storage 71. For example, when the heat storage is formed by stacking a plurality of metal meshes or the like as in the case of a heat storage in the related art, if the positions of the respective metal meshes are shifted, there is a possibility that the pass-through portions are not formed and clogging occurs inside the heat storage. In contrast, the pass-through portions 74 can be reliably provided in the heat storage 71 of the present embodiment.

In the heat storage 71, the heat exchange amount with the working gas is larger at a position closer to the heater 67 in the first direction where the working gas has a high temperature and a position closer to the cooler 68 in the first direction where the working gas has a low temperature, and the heat exchange amount with the working gas is relatively small at a central position in the first direction.

Therefore, the side elements 73 of the heat storage 71 may have different shapes depending on the positions in the first direction. For example, the side elements 73 disposed at the central portion in the first direction may have a smaller projected area S2 in the second direction than the side elements 73 disposed at both side portions of the heat storage 71 in the first direction.

In the heat exchanger 6 described above, the heater 67, the cooler 68, and the regenerator 69 are continuously connected to each other and provided in one piece. Specifically, the heater 67, the cooler 68, and the regenerator 69 are integrally provided by being continuously connected to each other in additive manufacturing using a metal powder material described later.

Since the heater, the cooler and the regenerator are provided in one piece, it is not necessary to separately provide the heater, the cooler, and the regenerator, to couple the heater, the cooler, and the regenerator by, for example, brazing or welding, or to provide the heater, the cooler, and the regenerator with flange portions to couple the heater, the cooler, and the regenerator by bolt fastening at the flange portions. Accordingly, it is possible to reduce the manufacturing time and the manufacturing cost of the heat exchanger 6. In addition, since a member for coupling is unnecessary, the size and weight of the heat exchanger 6 can be reduced.

In a heat exchanger implemented by coupling the heater, the regenerator, and the cooler that are separately provided, leakage of the working gas may occur at the coupling portion. In contrast, in the present embodiment, since the heater, the regenerator, and the cooler are provided in one piece, leakage of working gas can be avoided.

[Method for Manufacturing Heat Exchanger]

The heat exchanger 6 according to the present embodiment is formed by additive manufacturing technology (hereinafter also referred to as AM technology) that can manufacture a component having a complicated three-dimensional shape by depositing and solidifying metal powder materials layer by layer. According to the AM technology, it is possible to manufacture a component having a fine and complicated three-dimensional shape, which is difficult to manufacture by a manufacturing method in the related art such as machining or casting.

The heater 67 and the cooler 68 each have a flow channel (that is, the working gas flow channels 671 and 681, the heat source fluid flow channel 672, and the cooling fluid flow channel 682) having a fine and complicated three-dimensional shape, and can be manufactured by the AM technology. In particular, the structure in which the spiral flow generation portion 55 is provided in the fine heat source fluid flow channel 672 is difficult to manufacture by a manufacturing method in the related art that does not use the AM technology.

A regenerator in the related art is not manufactured using the AM technology and is formed by stacking metal meshes or the like inside a housing. The regenerator 69 of the present embodiment can be manufactured by forming the housing 70 and the heat storage 71 in one piece using the AM technology. In particular, the heat storage 71 has a fine and complicated three-dimensional shape implemented by the AM technology, and is difficult to manufacture by a manufacturing method in the related art that does not use the AM technology.

As described, the heater 67, the cooler 68, and the regenerator 69 can be manufactured by the AM technology, and are formed in one piece by the AM technology in the present embodiment. Accordingly, as described above, a process (brazing or the like) for coupling the heater, the cooler and the regenerator is unnecessary, and the manufacturing time and the manufacturing cost of the heat exchanger 6 can be reduced.

Figure 16:
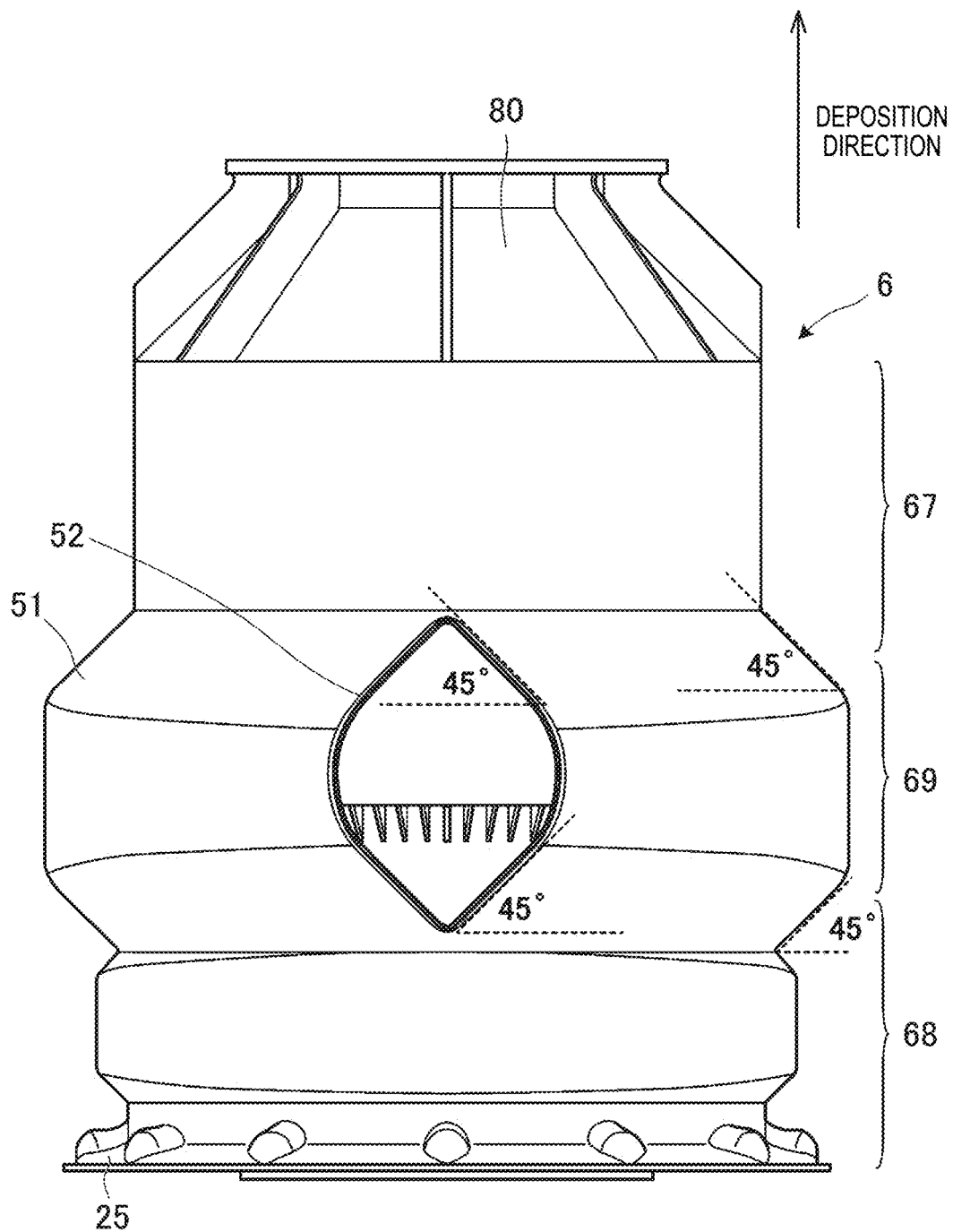
FIG. 16 is a side view of the heat exchanger 6, the heat source fluid introduction chamber 80, and a heat source fluid discharge channel 51 that are formed in one piece.

The first cylinder 23 and the ceiling wall 27 thereof provided on the inner peripheral side of the heat exchanger 6, the heat source fluid introduction chamber 80 provided above the heater 67 and the first cylinder 23, and the heat source fluid discharge channel 51 provided on the outer peripheral side of the heat exchanger 6 are formed in one piece with the heat exchanger 6 by the AM technology. Specifically, as illustrated in FIG. 16, for example, a metal powder material is deposited and solidified layer by layer upward with the flange portion 25 of the first cylinder 23 as a bottom surface to perform additive manufacturing. In particular, the plurality of grooves 29 provided in the ceiling wall 27 of the first cylinder 23 have fine shapes, and are difficult to form by a manufacturing method in the related art that does not use the AM technology.

Accordingly, it is unnecessary to assemble the heat exchanger 6, the first cylinder 23, the heat source fluid introduction chamber 80, and the heat source fluid discharge channel 51, and the manufacturing time and the manufacturing cost of the Stirling engine 1 can be reduced. The first cylinder 23, the heat source fluid introduction chamber 80, and the heat source fluid discharge channel 51 may not necessarily be formed in one piece with the heat exchanger 6. One or two of the first cylinder 23, the heat source fluid introduction chamber 80, and the heat source fluid discharge channel 51 may be formed in one piece with the heat exchanger 6.

Further, since the fine flow channels and the heat storage 71 can be manufactured by the AM technology, the size of the heat exchanger 6 can be reduced. In the Stirling engine, when the heat exchanger is large, the dead volume of the space through which the working gas flows is large, and the compression ratio of the working gas decreases. Therefore, the heat efficiency and the output decrease. In the present embodiment, since the size of the heat exchanger 6 is reduced, the ratio of the dead volume to the volume of the heat exchanger 6 can be reduced, and the heat efficiency and the output of the Stirling engine 1 can be improved.

In order to deposit the metal powder material at an inclination angle of less than a predetermined angle (for example, less than 45 degrees) with respect to a plane intersecting with a deposition direction when forming a component having a predetermined size by additive manufacturing, it is necessary to simultaneously form a support member that supports the inclined portion from below by additive manufacturing. When the support member is formed, it is necessary to remove the support member, for example, manually after component manufacturing.

In the present embodiment, in the heat exchanger 6, the first cylinder 23, the heat source fluid introduction chamber 80, and the heat source fluid discharge channel 51, an inclination angle equal to or greater than the predetermined angle (for example, 45 degrees) is appropriately set for a portion deposited on the upper side in an inclined manner, and formation of the support member is not necessary at the time of additive manufacturing. As illustrated in FIG. 16, for example, in the wall surface of the heat source fluid discharge channel 51 and the discharge portion 52 of the heat source fluid discharge channel 51, the inclination angle is set to 45 degrees for portions deposited on the upper side in an inclined manner. Accordingly, the formation of the support member can be avoided.

[Modification]

Although the Stirling engine 1 has been described as an example of the Stirling machine of the present invention in the embodiment described above, the present invention is not limited thereto. For example, the Stirling machine of the present invention may be a heat pump using a reverse Stirling cycle. Specifically, the heat pump serving as a Stirling machine may be configured such that the electric generator 11 of the Stirling engine 1 described above functions as a motor that inputs mechanical power to the piston crank mechanism 5 to cause the displacer piston 3 and the power piston 4 to reciprocate.

When the heat exchanger 6 is applied to the heat pump serving as a Stirling machine, the electric generator 11 functions as a motor, so that a fluid flowing through the heater 67 receives heat from the working gas and becomes a high-temperature fluid, and a fluid flowing through the cooler 68 has its heat absorbed by the working gas and becomes a low-temperature fluid. In the present embodiment, with a fine internal structure, the heat exchanger 6 has a reduced dead volume and high heat exchange performance, and thus the fluid can be heated to an ultra-high temperature or cooled to an extremely low temperature.

Although an embodiment of the present invention has been described above with reference to the accompanying drawings, it is needless to say that the present invention is not limited to the embodiment. It is apparent that those skilled in the art can conceive of various modifications and alterations within the scope described in the claims, and it is understood that such modifications and alterations naturally fall within the technical scope of the present invention. In addition, the components in the above embodiment may be freely combined without departing from the gist of the invention.

For example, although the β-type Stirling engine 1 has been described as an example of a Stirling machine to which the heat exchanger 6 is applied in the embodiment described above, the present invention is not limited thereto. The heat exchanger 6 may be applied to a Stirling machine having another form, specifically, an α-type Stirling engine, a γ-type Stirling engine, or the like.

Further, although an example has been described in which the regenerator 69 is applied to the Stirling engine 1 that is an example of a Stirling machine in the embodiment described above, the present invention is not limited thereto. The regenerator 69 can be applied to various heat engines.

Although the side element 73 constituting the heat storage 71 has a plate shape in the embodiment described above, the present invention is not limited thereto. The side element 73 may be a linear body.

In the present description, at least the following matters are described. In the parentheses, corresponding components and the like in the above embodiment are illustrated as an example, but the present invention is not limited thereto.

(1) A Stirling machine (Stirling engine 1) including:
a heat exchanger (heat exchanger 6) that includes a heater (heater 67), a regenerator (regenerator 69), and a cooler (cooler 68), which are connected in series;
an expansion chamber (expansion chamber 21) that is disposed on a heater side and configured to allow a working fluid (working gas) to expand therein; and
a compression chamber (compression chamber 22) that is disposed on a cooler side and configured to allow the working fluid to be compressed therein, in which
the Stirling machine is configured to perform a Stirling cycle to convert heat into mechanical power by repeatedly changing volumes of the expansion chamber and the compression chamber while circulating the working fluid between the expansion chamber and the compression chamber via the heat exchanger,
the heater includes
a first flow channel (working gas flow channel 671) communicating with the expansion chamber and the regenerator and configured to allow the working fluid to flow therethrough, and
a second flow channel (heat source fluid flow channel 672) configured to allow a first fluid (heat source fluid) for exchanging heat with the working fluid to flow therethrough,
a fluid introduction chamber (heat source fluid introduction chamber 80) for introducing the first fluid into the second flow channel of the heater is provided on an outer side of the expansion chamber, and
a partition wall (ceiling wall 27) partitioning the expansion chamber and the fluid introduction chamber from each other is provided with a plurality of grooves (grooves 29) on at least one of an expansion chamber side and a fluid introduction chamber side.

According to (1), since the expansion chamber and the fluid introduction chamber is partitioned from each other by the partition wall, heat exchange between the working fluid and the first fluid can be performed via the partition wall. Further, since the partition wall is provided with the plurality of grooves on at least one of the expansion chamber side and the fluid introduction chamber side, the surface area of the partition wall increases, and the working fluid can transfer more heat energy. Thus, the heat efficiency and output performance of the Stirling machine can be improved.

(2) The Stirling machine according to (1), in which
the partition wall includes a protruding portion (protruding portion 28) having a substantially conical shape and protruding toward the expansion chamber side, and
the fluid introduction chamber is provided with a guide portion (guide portion 83) extending along a central axis of the protruding portion and configured to guide the first fluid toward an apex part (apex part 28a) of the protruding portion.

According to (2), since the surface area of the partition wall is further increased by provision of the substantially conical protruding portion, it is possible to further increase the heat energy transferred by the working gas.

(3) The Stirling machine according to (2), in which
the plurality of grooves include grooves formed along a direction directing from the apex part toward the heater.

According to (3), the first fluid can smoothly flow from the apex part to the heater.

(4) The Stirling machine according to any one of (1) to (3), further including:
a cylinder (first cylinder 23); and
a piston (displacer piston 3) disposed inside the cylinder and configured to reciprocate, in which
the expansion chamber is a space surrounded by the piston and the cylinder, and
the partition wall is a ceiling wall (ceiling wall 27) of the cylinder.

According to (4), since the expansion chamber and the fluid introduction chamber are partitioned from each other by the ceiling wall of the cylinder, heat exchange between the working fluid and the first fluid can be performed via the ceiling wall.

(5) The Stirling machine according to (4), in which
the heat exchanger and the cylinder are an additive manufactured body formed by depositing a metal powder.

According to (5), the heat exchanger and the cylinder can be formed in one piece by additive manufacturing.

(6) A method for manufacturing the Stirling machine according to any one of (1) to (3), including:
forming the heater, the fluid introduction chamber, and the partition wall in one piece by additive manufacturing using a metal powder.

According to (6), the heater, the fluid introduction chamber, and the partition wall can be formed in one piece by additive manufacturing.

What is claimed is:

1. A Stirling machine comprising:
    a heat exchanger that includes a heater, a regenerator, and a cooler, the heater, the regenerator, and the cooler being connected in series;
    an expansion chamber that is disposed on a heater side and configured to allow a working fluid to expand therein; and
    a compression chamber that is disposed on a cooler side and configured to allow the working fluid to be compressed therein, wherein
    the Stirling machine is configured to perform a Stirling cycle to convert heat into mechanical power by repeatedly changing volumes of the expansion chamber and the compression chamber while circulating the working fluid between the expansion chamber and the compression chamber via the heat exchanger,
    the heater includes
        a first flow channel communicating with the expansion chamber and the regenerator and configured to allow the working fluid to flow therethrough, and
        a second flow channel configured to allow a first fluid for exchanging heat with the working fluid to flow therethrough,
    a fluid introduction chamber for introducing the first fluid into the second flow channel of the heater is provided on an outer side of the expansion chamber,
    a partition wall partitioning the expansion chamber and the fluid introduction chamber from each other is provided with a plurality of grooves on at least one of an expansion chamber side and a fluid introduction chamber side,
    the partition wall includes a protruding portion having a substantially conical shape and protruding toward the expansion chamber side, and
    the fluid introduction chamber is provided with a guide portion extending along a central axis of the protruding portion and configured to guide the first fluid toward an apex part of the protruding portion.

2. The Stirling machine according to claim 1, wherein the plurality of grooves include grooves formed along a direction directing from the apex part toward the heater.

3. The Stirling machine according to claim 1, further comprising:
    a cylinder; and
    a piston disposed inside the cylinder and configured to reciprocate, wherein
    the expansion chamber is a space surrounded by the piston and the cylinder, and
    the partition wall is a ceiling wall of the cylinder.

4. The Stirling machine according to claim 3, wherein the heat exchanger and the cylinder are an additive manufactured body formed by depositing a metal powder.

5. A method for manufacturing the Stirling machine according to claim 1, comprising:
    forming the heater, the fluid introduction chamber, and the partition wall in one piece by additive manufacturing using a metal powder.

\* \* \* \* \*